US011711201B2

(12) United States Patent
Weiler et al.

(10) Patent No.: US 11,711,201 B2
(45) Date of Patent: Jul. 25, 2023

(54) ENCODED STACK POINTERS

(71) Applicant: Intel Corporation, Santa Clara, CA (US)

(72) Inventors: Andrew James Weiler, Hillsboro, OR (US); David M. Durham, Beaverton, OR (US); Michael D. LeMay, Hillsboro, OR (US); Sergej Deutsch, Hillsboro, OR (US); Michael E. Kounavis, Portland, OR (US); Salmin Sultana, Hillsboro, OR (US); Karanvir S. Grewal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 67 days.

(21) Appl. No.: 17/213,568

(22) Filed: Mar. 26, 2021

(65) Prior Publication Data

US 2021/0218547 A1    Jul. 15, 2021

Related U.S. Application Data

(60) Provisional application No. 63/065,840, filed on Aug. 14, 2020.

(51) Int. Cl.
| | |
|---|---|
| *H04L 9/06* | (2006.01) |
| *G06F 9/50* | (2006.01) |
| *G06F 12/14* | (2006.01) |
| *H04L 9/08* | (2006.01) |
| *H04L 9/32* | (2006.01) |
| *G06F 12/121* | (2016.01) |

(52) U.S. Cl.
CPC .......... *H04L 9/0618* (2013.01); *G06F 9/5016* (2013.01); *G06F 12/121* (2013.01); *G06F 12/1408* (2013.01); *G06F 12/1441* (2013.01); *G06F 12/1458* (2013.01); *G06F 2212/7207* (2013.01)

(58) Field of Classification Search
CPC ... H04L 9/0618; H04L 9/0894; H04L 9/3242; G06F 9/5016; G06F 12/121; G06F 12/1408; G06F 12/1441; G06F 12/1458; G06F 2212/7207
See application file for complete search history.

(56) References Cited

U.S. PATENT DOCUMENTS 9,436,847 B2    9/2016 Durham et al.
10,838,878 B2 * 11/2020 Barnes .................. G06F 21/125
(Continued)

OTHER PUBLICATIONS

Encrypted Pointers in Protection System Design, by Lopriore, published 2011 (Year: 2011).*
(Continued)

*Primary Examiner* — Vu V Tran
(74) *Attorney, Agent, or Firm* — Alliance IP, LLC

(57) ABSTRACT

In one embodiment, an encoded pointer is constructed from a stack pointer that includes offset. The encoded pointer includes the offset value and ciphertext that is based on encrypting a portion of a decorated pointer that includes a maximum offset value. Stack data is encrypted based on the encoded pointer, and the encoded pointer is stored in a stack pointer register of a processor. To access memory, a decoded pointer is constructed based on decrypting the ciphertext of the encoded pointer and the offset value. Encrypted stack data is accessed based on the decoded pointer, and the encrypted stack is decrypted based on the encoded pointer.

12 Claims, 18 Drawing Sheets

(56) References Cited

U.S. PATENT DOCUMENTS

| | | | | |
|---|---|---|---|---|
| 2002/0194184 | A1* | 12/2002 | Baskins | G06F 16/9027 |
| 2003/0037248 | A1* | 2/2003 | Launchbury | G06F 12/1408 |
| | | | | 713/193 |
| 2011/0109431 | A1 | 5/2011 | Bragagnini et al. | |
| 2013/0080790 | A1 | 3/2013 | Pean et al. | |
| 2015/0302195 | A1* | 10/2015 | Acar | G06F 21/52 |
| | | | | 726/23 |
| 2019/0034664 | A1* | 1/2019 | Barnes | G06F 12/1441 |
| 2019/0227951 | A1 | 7/2019 | Durham et al. | |
| 2019/0272159 | A1 | 9/2019 | Pizlo et al. | |
| 2021/0224380 | A1* | 7/2021 | Grocutt | G06F 9/30189 |
| 2021/0240638 | A1 | 7/2021 | Deutsch et al. | |
| 2021/0374047 | A1* | 12/2021 | Lie | G06F 16/90335 |

OTHER PUBLICATIONS

Liljestrand, Hands; "Protecting the stack with PACed canaries," article retrieved from the Internet at https://arxiv.org/pdf/1909.05747.pdf#.~:text=A%20stack%20canary%20is%20a,the%20canary%20before%20function%20return; Sep. 2019; 6 pages.

WIKIPEDIA; "Shadow Stack" article retrieved from the Internet at https://en.wikipedia.org/w/index.php?title=Shadow_stack&oldid=997384056, page version as of Dec. 31, 2020, 2 pages.

WIKIPEDIA; "Stack buffer overflow" article retrieved from the Internet at https://en.wikipedia.org/wiki/stack_buffer_overflow#Stack_canaries, page version as of Jan. 13, 2021, 7 pages.

USPTO Non-Final OA for U.S. Appl. No. 17/214,222 (10 pages) dated Aug. 31, 2022.

Chefmax, "AddressSanitizer," May 15, 2019, retrieved on Jan. 23, 2022 from https://github.com/google/sanitizers/wiki/AddressSanitizer, 9 pages.

Phillips, Mitch, "AddressSanitizerAlgorithm," Oct. 3, 2017, retrieved on Jan. 23, 2022 from https://github.com/google/sanitizers/wiki/AddressSanitizerAlgorithm, 7 pages.

Serebryany, Konstantin et al, "AddressSanitizer: A Fast Address Sanity Checker," USENIX ATC 2012, retrieved on Jan. 23, 2022 from https://www.usenix.org/conference/usenixfederatedconferencesweek/addresssanitizer-fast-address-sanity-checker, 10 pages.

* cited by examiner

ENCODED STACK POINTERS

CROSS-REFERENCE TO RELATED APPLICATIONS

This application claims the benefit of, and priority from, U.S. Provisional Patent Application No. 63/065,840, entitled "Encoded Stack Pointers" and filed Aug. 14, 2020, the entire disclosure of which is incorporated herein by reference.

TECHNICAL FIELD

This disclosure relates in general to the field of computer systems, more particularly, to encoded stack pointers that include ciphertext.

BACKGROUND

Memory safety issues on the stack have been a persistent cause of security vulnerabilities, both targeting adjacent data on the stack as well as control flow parameters such as the return address. Safety issues that permit a stack buffer overrun can provide read or write access to data on a caller's stack frame and the return pointer, allowing a compromised callee to subvert control of the execution environment.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts.

DETAILED DESCRIPTION

Figure 1:
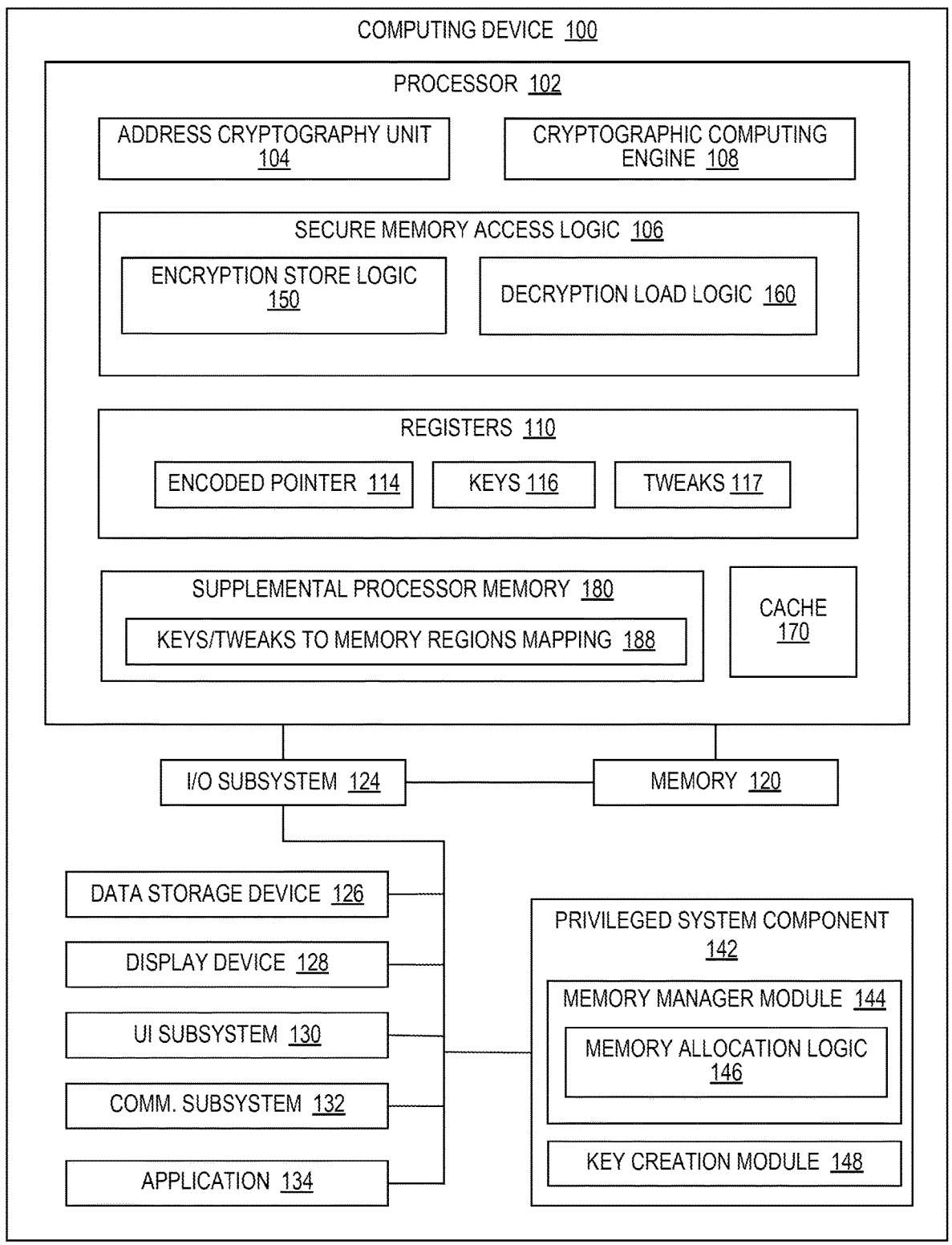
FIG. 1 is a simplified block diagram of an example computing device configured with secure memory access logic according to at least one embodiment of the present disclosure.

This disclosure provides various possible embodiments, or examples, for implementations of memory write instructions that may be used in the context of cryptographic computing. Generally, cryptographic computing may refer to computer system security solutions that employ cryptographic mechanisms inside processor components as part of its computation. Some cryptographic computing systems may implement the encryption and decryption of pointer addresses (or portions thereof), keys, data, and code in a processor core using encrypted memory access instructions. Thus, the microarchitecture pipeline of the processor core may be configured in such a way to support such encryption and decryption operations.

Embodiments disclosed in this application are related to proactively blocking out-of-bound accesses to memory while enforcing cryptographic isolation of memory regions within the memory. Cryptographic isolation may refer to isolation resulting from different regions or areas of memory being encrypted with one or more different parameters. Parameters can include keys and/or tweaks. Isolated memory regions can be composed of objects including data structures and/or code of a software entity (e.g., virtual machines (VMs), applications, functions, threads). Thus, isolation can be supported at arbitrary levels of granularity such as, for example, isolation between virtual machines, isolation between applications, isolation between functions, isolation between threads, or isolation between data structures (e.g., few byte structures).

Encryption and decryption operations of data or code associated with a particular memory region may be performed by a cryptographic algorithm using a key associated with that memory region. In at least some embodiments, the cryptographic algorithm may also (or alternatively) use a tweak as input. Generally, parameters such as 'keys' and 'tweaks' are intended to denote input values, which may be secret and/or unique, and which are used by an encryption or decryption process to produce an encrypted output value or decrypted output value, respectively. A key may be a unique value, at least among the memory regions or subregions being cryptographically isolated. Keys may be maintained, e.g., in either processor registers or processor memory (e.g., processor cache, content addressable memory (CAM), etc.) that is accessible through instruction set extensions. A tweak can be derived from an encoded pointer (e.g., security context information embedded therein) to the memory address where data or code being encrypted/decrypted is stored or is to be stored and, in at least some scenarios, can also include security context information associated with the memory region.

At least some embodiments disclosed in this specification, including read and write operations, are related to pointer based data encryption and decryption in which a pointer to a memory location for data or code is encoded with a tag and/or other metadata (e.g., security context information) and may be used to derive at least a portion of tweak input to data or code cryptographic (e.g., encryption and decryption) algorithms. Thus, a cryptographic binding can be created between the cryptographic addressing layer and data/code encryption and decryption. This implicitly enforces bounds since a pointer that strays beyond the end of an object (e.g., data) is likely to use an incorrect tag value for that adjacent object. In one or more embodiments, a pointer is encoded with a linear address (also referred to herein as "memory address") to a memory location and metadata. In some pointer encodings, a slice or segment of the address in the pointer includes a plurality of bits and is encrypted (and decrypted) based on a secret address key and a tweak based on the metadata. Other pointers can be encoded with a plaintext memory address (e.g., linear address) and metadata.

For purposes of illustrating the several embodiments for proactively blocking out-of-bound memory accesses while enforcing cryptographic isolation of memory regions, it is important to first understand the operations and activities associated with data protection and memory safety. Accordingly, the following foundational information may be viewed as a basis from which the present disclosure may be properly explained.

Known computing techniques (e.g., page tables for process/kernel separation, virtual machine managers, managed runtimes, etc.) have used architecture and metadata to provide data protection and isolation. For example, in previous solutions, memory controllers outside the CPU boundary support memory encryption and decryption at a coarser granularity (e.g., applications), and isolation of the encrypted data is realized via access control. Typically, a cryptographic engine is placed in a memory controller, which is outside a CPU core. In order to be encrypted, data travels from the core to the memory controller with some identification of which keys should be used for the encryption. This identification is communicated via bits in the physical address. Thus, any deviation to provide additional keys or tweaks could result in increased expense (e.g., for new buses) or additional bits being "stolen" from the address bus to allow additional indexes or identifications for keys or tweaks to be carried with the physical address. Access control can require the use of metadata and a processor would use lookup tables to encode policy or data about the data for ownership, memory size, location, type, version, etc. Dynamically storing and loading metadata requires additional storage (memory overhead) and impacts performance, particularly for fine grain metadata (such as for function as a service (FaaS) workloads or object bounds information).

Cryptographic isolation of memory compartments (also referred to herein as 'memory regions'), resolves many of the aforementioned issues (and more). Cryptographic isolation may make redundant the legacy modes of process separation, user space, and kernel with a fundamentally new fine-grain protection model. With cryptographic isolation of memory compartments, protections are cryptographic, with various types of processor units (e.g., processors and accelerators) alike utilizing secret keys (and optionally tweaks) and ciphers to provide access control and separation at increasingly finer granularities. Indeed, isolation can be supported for memory compartments as small as a one-byte object to as large as data and code for an entire virtual machine. In at least some scenarios, cryptographic isolation may result in individual applications or functions becoming the boundary, allowing each address space to contain multiple distinct applications or functions. Objects can be selectively shared across isolation boundaries via pointers. These pointers can be cryptographically encoded or non-cryptographically encoded. Furthermore, in one or more embodiments, encryption and decryption happens inside the processor core, within the core boundary. Because encryption happens before data is written to a memory unit outside the core, such as the L1 cache or main memory, it is not necessary to "steal" bits from the physical address to convey key or tweak information, and an arbitrarily large number of keys and/or tweaks can be supported.

Cryptographic isolation leverages the concept of a cryptographic addressing layer where the processor encrypts at least a portion of software allocated memory addresses (addresses within the linear/virtual address space, also referred to as "pointers") based on implicit and/or explicit metadata (e.g., context information) and/or a slice of the memory address itself (e.g., as a tweak to a tweakable block cipher (e.g., XOR-encrypt-XOR-based tweaked-codebook mode with ciphertext stealing (XTS)). As used herein, a "tweak" may refer to, among other things, an extra input to a block cipher, in addition to the usual plaintext or ciphertext input and the key. A tweak comprises one or more bits that represent a value. In one or more embodiments, a tweak may compose all or part of an initialization vector (IV) for a block cipher. A resulting cryptographically encoded pointer can comprise an encrypted portion (or slice) of the memory address and some bits of encoded metadata (e.g., context information). When decryption of an address is performed, if the information used to create the tweak (e.g., implicit and/or explicit metadata, plaintext address slice of the memory address, etc.) corresponds to the original allocation of the memory address by a memory allocator (e.g., software allocation method), then the processor can correctly decrypt the address. Otherwise, a random address result will cause a fault and get caught by the processor.

These cryptographically encoded pointers (or portions thereof) may be further used by the processor as a tweak to the data encryption cipher used to encrypt/decrypt data they refer to (data referenced by the cryptographically encoded pointer), creating a cryptographic binding between the cryptographic addressing layer and data/code encryption. In some embodiments, the cryptographically encoded pointer may be decrypted and decoded to obtain the linear address. The linear address (or a portion thereof) may be used by the processor as a tweak to the data encryption cipher. Alternatively, in some embodiments, the memory address may not be encrypted but the pointer may still be encoded with some metadata representing a unique value among pointers. In this embodiment, the encoded pointer (or a portion thereof) may be used by the processor as a tweak to the data encryption cipher. It should be noted that a tweak that is used as input to a block cipher to encrypt/decrypt a memory address is also referred to herein as an "address tweak". Similarly, a tweak that is used as input to a block cipher to encrypt/decrypt data is also referred to herein as a "data tweak".

Although the cryptographically encoded pointer (or non-cryptographically encoded pointers) can be used to isolate data, via encryption, the integrity of the data may still be vulnerable. For example, unauthorized access of cryptographically isolated data can corrupt the memory region where the data is stored regardless of whether the data is encrypted, corrupting the data contents unbeknownst to the victim. Data integrity may be supported using an integrity verification (or checking) mechanism such as message authentication codes (MACS) or implicitly based on an entropy measure of the decrypted data, or both. In one example, MAC codes may be stored per cacheline and evaluated each time the cacheline is read to determine whether the data has been corrupted. Such mechanisms, however, do not proactively detect unauthorized memory accesses. Instead, corruption of memory (e.g., out-of-bounds access) may be detected in a reactive manner (e.g., after the data is written) rather than a proactive manner (e.g., before the data is written). For example, memory corruption may occur by a write operation performed at a memory location that is out-of-bounds for the software entity. With cryptographic computing, the write operation may use a key and/or a tweak that is invalid for the memory location. When a subsequent read operation is performed at that memory location, the read operation may use a different key on the corrupted memory and detect the corruption. For example, if the read operation uses the valid key and/or tweak), then the retrieved data will not decrypt properly and the corruption can be detected using a message authentication code, for example, or by detecting a high level of entropy (randomness) in the decrypted data (implicit integrity).

Turning to FIG. 1, FIG. 1 is a simplified block diagram of an example computing device 100 for implementing a proactive blocking technique for out-of-bound accesses to memory while enforcing cryptographic isolation of memory regions using secure memory access logic according to at least one embodiment of the present disclosure. In the example shown, the computing device 100 includes a processor 102 with an address cryptography unit 104, a cryptographic computing engine 108, secure memory access logic 106, and memory components, such as a cache 170 (e.g., L1 cache, L2 cache) and supplemental processor memory 180. Secure memory access logic 106 includes encryption store logic 150 to encrypt data based on various keys and/or tweaks and then store the encrypted data and decryption load logic 160 to read and then decrypt data based on the keys and/or tweaks. Cryptographic computing engine 108 may be configured to decrypt data or code for load operations based on various keys and/or tweaks and to encrypt data or code for store operations based on various keys and/or tweaks. Address cryptography unit 104 may be configured to decrypt and encrypt a linear address (or a portion of the linear address) encoded in a pointer to the data or code referenced by the linear address.

Processor 102 also includes registers 110, which may include e.g., general purpose registers and special purpose registers (e.g., control registers, model-specific registers (MSRs), etc.). Registers 110 may contain various data that may be used in one or more embodiments, such as an encoded pointer 114 to a memory address. The encoded pointer may be cryptographically encoded or non-cryptographically encoded. An encoded pointer is encoded with some metadata. If the encoded pointer is cryptographically encoded, at least a portion (or slice) of the address bits is encrypted. In some embodiments, keys 116 used for encryption and decryption of addresses, code, and/or data may be stored in registers 110. In some embodiments, tweaks 117 used for encryption and decryption of addresses, code, and/or data may be stored in registers 110.

The secure memory access logic 106 utilizes metadata about encoded pointer 114, which is encoded into unused bits of the encoded pointer 114 (e.g., non-canonical bits of a 64-bit address, or a range of addresses set aside, e.g., by the operating system, such that the corresponding high order bits of the address range may be used to store the metadata), in order to secure and/or provide access control to memory locations pointed to by the encoded pointer 114. For example, the metadata encoding and decoding provided by the secure memory access logic 106 can prevent the encoded pointer 114 from being manipulated to cause a buffer overflow, and/or can prevent program code from accessing memory that it does not have permission to access. Pointers may be encoded when memory is allocated (e.g., by an operating system, in the heap) and provided to executing programs in any of a number of different ways, including by using a function such as malloc, alloc, or new; or implicitly via the loader, or statically allocating memory by the compiler, etc. As a result, the encoded pointer 114, which points to the allocated memory, is encoded with the address metadata.

The address metadata can include valid range metadata. The valid range metadata allows executing programs to manipulate the value of the encoded pointer 114 within a valid range, but will corrupt the encoded pointer 114 if the memory is accessed using the encoded pointer 114 beyond the valid range. Alternatively or in addition, the valid range metadata can be used to identify a valid code range, e.g., a range of memory that program code is permitted to access (e.g. the encoded range information can be used to set explicit ranges on registers). Other information that can be encoded in the address metadata includes access (or permission) restrictions on the encoded pointer 114 (e.g., whether the encoded pointer 114 can be used to write, execute, or read the referenced memory).

In at least some other embodiments, other metadata (or context information) can be encoded in the unused bits of encoded pointer 114 such as a size of plaintext address slices (e.g., number of bits in a plaintext slice of a memory address embedded in the encoded pointer), a memory allocation size (e.g., bytes of allocated memory referenced by the encoded pointer), a type of the data or code (e.g., class of data or code defined by programming language), permissions (e.g., read, write, and execute permissions of the encoded pointer), a location of the data or code (e.g., where the data or code is stored), the memory location where the pointer itself is to be stored, an ownership of the data or code, a version of the encoded pointer (e.g., a sequential number that is incremented each time an encoded pointer is created for newly allocated memory, determines current ownership of the referenced allocated memory in time), a tag of randomized bits (e.g., generated for association with the encoded pointer), a privilege level (e.g., user or supervisor), a cryptographic context identifier (or crypto context ID) (e.g., randomized or deterministically unique value for each encoded pointer), etc. For example, in one embodiment, the address metadata can include size metadata that encodes the size of a plaintext address slice in the encoded pointer. The size metadata may specify a number of lowest order bits in the encoded pointer that can be modified by the executing program. The size metadata is dependent on the amount of memory requested by a program. Accordingly, if 16 bytes are requested, then size metadata is encoded as 4 (or 00100 in five upper bits of the pointer) and the 4 lowest bits of the pointer are designated as modifiable bits to allow addressing to the requested 16 bytes of memory. In some embodiments, the address metadata may include a tag of randomized bits associated with the encoded pointer to make the tag unpredictable for an adversary. An adversary may try to guess the tag value so that the adversary is able to access the memory referenced by the pointer, and randomizing the tag value may make it less likely that the adversary will successfully guess the value compared to a deterministic approach for generating a version value. In some embodiments, the pointer may include a version number (or other deterministically different value) determining current ownership of the referenced allocated data in time instead of or in addition to a randomized tag value. Even if an adversary is able to guess the current tag value or version number for a region of memory, e.g., because the algorithm for generating the version numbers is predictable, the adversary may still be unable to correctly generate the corresponding encrypted portion of the pointer due to the adversary not having access to the key that will later be used to decrypt that portion of the pointer.

The example secure memory access logic 106 is embodied as part of processor instructions (e.g., as part of the processor instruction set architecture), or microcode (e.g., instructions that are stored in read-only memory and executed directly by the processor 102). In other embodiments, portions of the secure memory access logic 106 may be embodied as hardware, firmware, software, or a combination thereof (e.g., as programming code executed by a privileged system component 142 of the computing device 100). In one example, decryption load logic 160 and encryption store logic 150 are embodied as part of new load (read) and store (write) processor instructions that perform respective decryption and encryption operations to isolate memory compartments. Decryption load logic 160 and encryption store logic 150 verify encoded metadata on memory read and write operations that utilize the new processor instructions (e.g., which may be counterparts to existing processor instructions such as MOV), where a general purpose register is used as a memory address to read a value from memory (e.g., load) or to write a value to memory (e.g., store).

The secure memory access logic 106 is executable by the computing device 100 to provide security for encoded pointers "inline," e.g., during execution of a program (such as a user space application 134) by the computing device 100. As used herein, the terms "indirect address" and "pointer" may each refer to, among other things, an address (e.g. virtual address or linear address) of a memory location at which other data or instructions are stored. In an example, a register that stores an encoded memory address of a memory location where data or code is stored may act as a pointer. As such, the encoded pointer 114 may be embodied as, for example, a data pointer (which refers to a location of data), a code pointer (which refers to a location of executable code), an instruction pointer, or a stack pointer. As used herein, "context information" includes "metadata" and may refer to, among other things, information about or relating to an encoded pointer 114, such as a valid data range, a valid code range, pointer access permissions, a size of plaintext address slice (e.g., encoded as a power in bits), a memory allocation size, a type of the data or code, a location of the data or code, an ownership of the data or code, a version of the pointer, a tag of randomized bits, version, a privilege level of software, a cryptographic context identifier, etc.

As used herein, "memory access instruction" may refer to, among other things, a "MOV" or "LOAD" instruction or any other instruction that causes data to be read, copied, or otherwise accessed at one storage location, e.g., memory, and moved into another storage location, e.g., a register (where "memory" may refer to main memory or cache, e.g., a form of random access memory, and "register" may refer to a processor register, e.g., hardware), or any instruction that accesses or manipulates memory. Also as used herein, "memory access instruction" may refer to, among other things, a "MOV" or "STORE" instruction or any other instruction that causes data to be read, copied, or otherwise accessed at one storage location, e.g., a register, and moved into another storage location, e.g., memory, or any instruction that accesses or manipulates memory.

The address cryptography unit 104 can include logic (including circuitry) to perform address decoding of an encoded pointer to obtain a linear address of a memory location of data (or code). The address decoding can include decryption if needed (e.g., if the encoded pointer includes an encrypted portion of a linear address) based at least in part on a key and/or on a tweak derived from the encoded pointer. The address cryptography unit 104 can also include logic (including circuitry) to perform address encoding of the encoded pointer, including encryption if needed (e.g., the encoded pointer includes an encrypted portion of a linear address), based at least in part on the same key and/or on the same tweak used to decode the encoded pointer. Address encoding may also include storing metadata in the noncanonical bits of the pointer. Various operations such as address encoding and address decoding (including encryption and decryption of the address or portions thereof) may be performed by processor instructions associated with address cryptography unit 104, other processor instructions, or a separate instruction or series of instructions, or a higher-level code executed by a privileged system component such as an operating system kernel or virtual machine monitor, or as an instruction set emulator. As described in more detail below, address encoding logic and address decoding logic each operate on an encoded pointer 114 using metadata (e.g., one or more of valid range, permission metadata, size (power), memory allocation size, type, location, ownership, version, tag value, privilege level (e.g., user or supervisor), crypto context ID, etc.) and a secret key (e.g., keys 116), in order to secure the encoded pointer 114 at the memory allocation/access level.

The encryption store logic 150 and decryption load logic 160 can use cryptographic computing engine 108 to perform cryptographic operations on data to be stored at a memory location referenced by encoded pointer 114 or obtained from a memory location referenced by encoded pointer 114. The cryptographic computing engine 108 can include logic (including circuitry) to perform data (or code) decryption based at least in part on a tweak derived from an encoded pointer to a memory location of the data (or code), and to perform data (or code) encryption based at least in part on a tweak derived from an encoded pointer to a memory location for the data (or code). The cryptographic operations of the engine 108 may use a tweak, which includes at least a portion of the encoded pointer 114 (or the linear address generated from the encoded pointer) and/or a secret key (e.g., keys 116) in order to secure the data or code at the memory location referenced by the encoded pointer 114 by binding the data/code encryption and decryption to the encoded pointer.

Various different cryptographic algorithms may be used to implement the address cryptography unit 104 and cryptographic computing engine 108. Generally, Advanced Encryption Standard (AES) has been the mainstay for data encryption for decades, using a 128 bit block cipher. Meanwhile, memory addressing is typically 64 bits today. Although embodiments herein may be illustrated and explained with reference to 64-bit memory addressing for 64 computers, the disclosed embodiments are not intended to be so limited and can easily be adapted to accommodate 32 bits, 128 bits, or any other available bit sizes for pointers. Likewise, embodiments herein may further be adapted to accommodate various sizes of a block cipher (e.g., 64 bit, 48 bit, 32 bit, 16 bit, etc. using Simon, Speck, tweakable K-cipher, PRINCE or any other block cipher).

Lightweight ciphers suitable for pointer-based encryption have also emerged recently. The PRINCE cipher, for example, can be implemented in 3 clocks requiring as little as 799 µm² of area in the 10 nm process, providing half the latency of AES in a tenth the Silicon area. Cryptographic isolation may utilize these new ciphers, as well as others, introducing novel computer architecture concepts including, but not limited to: (i) cryptographic addressing, i.e., the encryption of data pointers at the processor using, as tweaks, contextual information about the referenced data (e.g., metadata embedded in the pointer and/or external metadata), a slice of the address itself, or any suitable combination thereof; and (ii) encryption of the data itself at the core, using cryptographically encoded pointers or portions thereof, non-cryptographically encoded pointers or portion(s) thereof, contextual information about the referenced data, or any suitable combination thereof as tweaks for the data encryption. A variety of encryption modes that are tweakable can be used for this purpose of including metadata (e.g., counter mode (CTR) and XOR-encrypt-XOR (XEX)-based tweaked-codebook mode with ciphertext stealing (XTS)). In addition to encryption providing data confidentiality, its implicit integrity may allow the processor to determine if the data is being properly decrypted using the correct keystream and tweak. In some block cipher encryption modes, the block cipher creates a keystream, which is then combined (e.g., using XOR operation or other more complex logic) with an input block to produce the encrypted or decrypted block. In some block ciphers, the keystream is fed into the next block cipher to perform encryption or decryption.

The example encoded pointer 114 in FIG. 1 is embodied as a register 110 (e.g., a general purpose register of the processor 102). The example secret keys 116 may be generated by a key creation module 148 of a privileged system component 142, and stored in one of the registers 110 (e.g., a special purpose register or a control register such as a model specific register (MSR)), another memory location that is readable by the processor 102 (e.g., firmware, a secure portion of a data storage device 126, etc.), in external memory, or another form of memory suitable for performing the functions described herein. In some embodiments, tweaks for encrypting addresses, data, or code may be computed in real time for the encryption or decryption. Tweaks 117 may be stored in registers 110, another memory location that is readable by the processor 102 (e.g., firmware, a secure portion of a data storage device 126, etc.), in external memory, or another form of memory suitable for performing the functions described herein. In some embodiments, the secret keys 116 and/or tweaks 117 are stored in a location that is readable only by the processor, such as supplemental processor memory 180. In at least one embodiment, the supplemental processor memory 180 may be implemented as a new cache or content addressable memory (CAM). In one or more implementations, supplemental processor memory 180 may be used to store information related to cryptographic isolation such as keys and potentially tweaks, credentials, and/or context IDs.

Secret keys may also be generated and associated with cryptographically encoded pointers for encrypting/decrypting the address portion (or slice) encoded in the pointer. These keys may be the same as or different than the keys associated with the pointer to perform data (or code) encryption/decryption operations on the data (or code) referenced by the cryptographically encoded pointer. For ease of explanation, the terms "secret address key" or "address key" may be used to refer to a secret key used in encryption and decryption operations of memory addresses and the terms "secret data key" or "data key" may be used to refer to a secret key used in operations to encrypt and decrypt data or code.

On (or during) a memory allocation operation (e.g., a "malloc"), memory allocation logic 146 allocates a range of memory for a buffer, returns a pointer along with the metadata (e.g., one or more of range, permission metadata, size (power), memory allocation size, type, location, ownership, version, tag, privilege level, crypto context ID, etc.). In one example, the memory allocation logic 146 may encode plaintext range information in the encoded pointer 114 (e.g., in the unused/non-canonical bits, prior to encryption), or supply the metadata as one or more separate parameters to the instruction, where the parameter(s) specify the range, code permission information, size (power), memory allocation size, type, location, ownership, version, tag, privilege level (e.g., user or supervisor), crypto context ID, or some suitable combination thereof. Illustratively, the memory allocation logic 146 may be embodied in a memory manager module 144 of the privileged system component 142. The memory allocation logic 146 causes the pointer 114 to be encoded with the metadata (e.g., range, permission metadata, size (power), memory allocation size, type, location, ownership, version, tag value, privilege level, crypto context ID, some suitable combination thereof, etc.). The metadata may be stored in an unused portion of the encoded pointer 114 (e.g., non-canonical bits of a 64-bit address). For some metadata or combinations of metadata, the pointer 114 may be encoded in a larger address space (e.g., 128-bit address, 256-bit address) to accommodate the size of the metadata or combination of metadata.

To determine valid range metadata, example range rule logic selects the valid range metadata to indicate an upper limit for the size of the buffer referenced by the encoded pointer 114. Address adjustment logic adjusts the valid range metadata as needed so that the upper address bits (e.g., most significant bits) of the addresses in the address range do not change as long as the encoded pointer 114 refers to a memory location that is within the valid range indicated by the range metadata. This enables the encoded pointer 114 to be manipulated (e.g., by software performing arithmetic operations, etc.) but only so long as the manipulations do not cause the encoded pointer 114 to go outside the valid range (e.g., overflow the buffer).

In an embodiment, the valid range metadata is used to select a portion (or slice) of the encoded pointer 114 to be encrypted. In other embodiments, the slice of the encoded pointer 114 to be encrypted may be known a priori (e.g., upper 32 bits, lower 32 bits, etc.). The selected slice of the encoded pointer 114 (and the adjustment, in some embodiments) is encrypted using a secret address key (e.g., keys 116) and optionally, an address tweak, as described further below. On a memory access operation (e.g., a read, write, or execute operation), the previously-encoded pointer 114 is decoded. To do this, the encrypted slice of the encoded pointer 114 (and in some embodiments, the encrypted adjustment) is decrypted using a secret address key (e.g., keys 116) and an address tweak (if the address tweak was used in the encryption), as described further below.

The encoded pointer 114 is returned to its original (e.g., canonical) form, based on appropriate operations in order to restore the original value of the encoded pointer 114 (e.g., the true, original linear memory address). To do this in at least one possible embodiment, the address metadata encoded in the unused bits of the encoded pointer 114 are removed (e.g., return the unused bits to their original form). If the encoded pointer 114 decodes successfully, the memory access operation completes successfully. However, if the encoded pointer 114 has been manipulated (e.g., by software, inadvertently or by an attacker) so that its value falls outside the valid range indicated by the range metadata (e.g., overflows the buffer), the encoded pointer 114 may be corrupted as a result of the decrypting process performed on the encrypted address bits in the pointer. A corrupted pointer will raise a fault (e.g., a general protection fault or a page fault if the address is not mapped as present from the paging structures/page tables). One condition that may lead to a fault being generated is a sparse address space. In this scenario, a corrupted address is likely to land on an unmapped page and generate a page fault. Even if the corrupted address lands on a mapped page, it is highly likely that the authorized tweak or initialization vector for that memory region is different from the corrupted address that may be supplied as a tweak or initialization vector in this case. In this way, the computing device 100 provides encoded pointer security against buffer overflow attacks and similar exploits.

Referring now in more detail to FIG. 1, the computing device 100 may be embodied as any type of electronic device for performing the functions described herein. For example, the computing device 100 may be embodied as, without limitation, a smart phone, a tablet computer, a wearable computing device, a laptop computer, a notebook computer, a mobile computing device, a cellular telephone, a handset, a messaging device, a vehicle telematics device, a server computer, a workstation, a distributed computing system, a multiprocessor system, a consumer electronic device, and/or any other computing device configured to perform the functions described herein. As shown in FIG. 1, the example computing device 100 includes at least one processor 102 embodied with the secure memory access logic 106, the address cryptography unit 104, and the cryptographic computing engine 108.

The computing device 100 also includes memory 120, an input/output subsystem 124, a data storage device 126, a display device 128, a user interface (UI) subsystem 130, a communication subsystem 132, application 134, and the privileged system component 142 (which, illustratively, includes memory manager module 144 and key creation module 148). The computing device 100 may include other or additional components, such as those commonly found in a mobile and/or stationary computers (e.g., various sensors and input/output devices), in other embodiments. Additionally, in some embodiments, one or more of the example components may be incorporated in, or otherwise form a portion of, another component. Each of the components of the computing device 100 may be embodied as software, firmware, hardware, or a combination of software and hardware.

The processor 102 may be embodied as any type of processor capable of performing the functions described herein. For example, the processor 102 may be embodied as a single or multi-core central processing unit (CPU), a multiple-CPU processor or processing/controlling circuit, or multiple diverse processing units or circuits (e.g., CPU and Graphics Processing Unit (GPU), etc.).

Processor memory may be provisioned inside a core and outside the core boundary. For example, registers 110 may be included within the core and may be used to store encoded pointers (e.g., 114), secret keys 116 and possibly tweaks 117 for encryption and decryption of data or code and addresses. Processor 102 may also include cache 170, which may be L1 and/or L2 cache for example, where data is stored when it is retrieved from memory 120 in anticipation of being fetched by processor 102.

The processor may also include supplemental processor memory 180 outside the core boundary. Supplemental processor memory 180 may be a dedicated cache that is not directly accessible by software. In one or more embodiments, supplemental processor memory 180 may store the mapping 188 between parameters and their associated memory regions. For example, keys may be mapped to their corresponding memory regions in the mapping 188. In some embodiments, tweaks that are paired with keys may also be stored in the mapping 188. In other embodiments, the mapping 188 may be managed by software.

Generally, keys and tweaks can be handled in any suitable manner based on particular needs and architecture implementations. In a first embodiment, both keys and tweaks may be implicit, and thus are managed by a processor. In this embodiment, the keys and tweaks may be generated internally by the processor or externally by a secure processor. In a second embodiment, both the keys and the tweaks are explicit, and thus are managed by software. In this embodiment, the keys and tweaks are referenced at instruction invocation time using instructions that include operands that reference the keys and tweaks. The keys and tweaks may be stored in registers or memory in this embodiment. In a third embodiment, the keys may be managed by a processor, while the tweaks may be managed by software.

The memory 120 of the computing device 100 may be embodied as any type of volatile or non-volatile memory or data storage capable of performing the functions described herein. Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in memory is synchronous dynamic random access memory (SDRAM). In particular embodiments, DRAM of memory 122 complies with a standard promulgated by the Joint Electron Device Engineering Council (JEDEC), such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Non-volatile memory is a storage medium that does not require power to maintain the state of data stored by the medium. Nonlimiting examples of non-volatile memory may include any or a combination of: solid state memory (such as planar or 3D NAND flash memory or NOR flash memory), 3D crosspoint memory, memory devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EE- PROM), other various types of non-volatile random access memories (RAMS), and magnetic storage memory.

In some embodiments, memory 120 comprises one or more memory modules, such as dual in-line memory modules (DIMMs). In some embodiments, the memory 120 may be located on one or more integrated circuit chips that are distinct from an integrated circuit chip comprising processor 102 or may be located on the same integrated circuit chip as the processor 102. Memory 120 may comprise any suitable type of memory and is not limited to a particular speed or technology of memory in various embodiments.

In operation, the memory 120 may store various data and code used during operation of the computing device 100, as well as operating systems, applications, programs, libraries, and drivers. Memory 120 may store data and/or code, which includes sequences of instructions that are executed by the processor 102.

The memory 120 is communicatively coupled to the processor 102, e.g., via the I/O subsystem 124. The I/O subsystem 124 may be embodied as circuitry and/or components to facilitate input/output operations with the processor 102, the memory 120, and other components of the computing device 100. For example, the I/O subsystem 124 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 102, the memory 120, and/or other components of the computing device 100, on a single integrated circuit chip.

The data storage device 126 may be embodied as any type of physical device or devices configured for short-term or long-term storage of data such as, for example, memory devices and circuits, memory cards, hard disk drives, solid-state drives, flash memory or other read-only memory, memory devices that are combinations of read-only memory and random access memory, or other data storage devices. In various embodiments, memory 120 may cache data that is stored on data storage device 126.

The display device 128 may be embodied as any type of display capable of displaying digital information such as a liquid crystal display (LCD), a light emitting diode (LED), a plasma display, a cathode ray tube (CRT), or other type of display device. In some embodiments, the display device 128 may be coupled to a touch screen or other human computer interface device to allow user interaction with the computing device 100. The display device 128 may be part of the user interface (UI) subsystem 130. The user interface subsystem 130 may include a number of additional devices to facilitate user interaction with the computing device 100, including physical or virtual control buttons or keys, a microphone, a speaker, a unidirectional or bidirectional still and/or video camera, and/or others. The user interface subsystem 130 may also include devices, such as motion sensors, proximity sensors, and eye tracking devices, which may be configured to detect, capture, and process various other forms of human interactions involving the computing device 100.

The computing device 100 further includes a communication subsystem 132, which may be embodied as any communication circuit, device, or collection thereof, capable of enabling communications between the computing device 100 and other electronic devices. The communication subsystem 132 may be configured to use any one or more communication technology (e.g., wireless or wired communications) and associated protocols (e.g., Ethernet, Bluetooth™, Wi-Fi™, WiMAX, 3G/LTE, etc.) to effect such communication. The communication subsystem 132 may be embodied as a network adapter, including a wireless network adapter.

The example computing device 100 also includes a number of computer program components, such as one or more user space applications (e.g., application 134) and the privileged system component 142. The user space application may be embodied as any computer application (e.g., software, firmware, hardware, or a combination thereof) that interacts directly or indirectly with an end user via, for example, the display device 128 or the UI subsystem 130. Some examples of user space applications include word processing programs, document viewers/readers, web browsers, electronic mail programs, messaging services, computer games, camera and video applications, etc. Among other things, the privileged system component 142 facilitates the communication between the user space application (e.g., application 134) and the hardware components of the computing device 100. Portions of the privileged system component 142 may be embodied as any operating system capable of performing the functions described herein, such as a version of WINDOWS by Microsoft Corporation, ANDROID by Google, Inc., and/or others. Alternatively or in addition, a portion of the privileged system component 142 may be embodied as any type of virtual machine monitor capable of performing the functions described herein (e.g., a type I or type II hypervisor).

The example privileged system component 142 includes key creation module 148, which may be embodied as software, firmware, hardware, or a combination of software and hardware. For example, the key creation module 148 may be embodied as a module of an operating system kernel, a virtual machine monitor, or a hypervisor. The key creation module 148 creates the secret keys 116 (e.g., secret address keys and secret data keys) and may write them to a register or registers to which the processor 102 has read access (e.g., a special purpose register). To create a secret key, the key creation module 148 may execute, for example, a random number generator or another algorithm capable of generating a secret key that can perform the functions described herein. In other implementations, secret keys may be written to supplemental processor memory 180 that is not directly accessible by software. In yet other implementations, secret keys may be encrypted and stored in memory 120. In one or more embodiments, when a data key is generated for a memory region allocated to a particular software entity the data key may be encrypted, and the software entity may be provided with the encrypted data key, a pointer to the encrypted data key, or a data structure including the encrypted key or pointer to the encrypted data key. In other implementations, the software entity may be provided with a pointer to the unencrypted data key stored in processor memory or a data structure including a pointer to the unencrypted data key. Generally, any suitable mechanism for generating, storing, and providing secure keys to be used for encrypting and decrypting data (or code) and to be used for encrypting and decrypting memory addresses (or portions thereof) encoded in pointers may be used in embodiments described herein.

It should be noted that a myriad of approaches could be used to generate or obtain a key for embodiments disclosed herein. For example, although the key creation module 148 is shown as being part of computing device 100, one or more secret keys could be obtained from any suitable external source using any suitable authentication processes to securely communicate the key to computing device 100, which may include generating the key as part of those processes. Furthermore, privileged system component 142 may be part of a trusted execution environment (TEE), virtual machine, processor 102, a co-processor, or any other suitable hardware, firmware, or software in computing device 100 or securely connected to computing device 100. Moreover, the key may be "secret", which is intended to mean that its value is kept hidden, inaccessible, obfuscated, or otherwise secured from unauthorized actors (e.g., software, firmware, machines, extraneous hardware components, and humans).

Figure 2A:
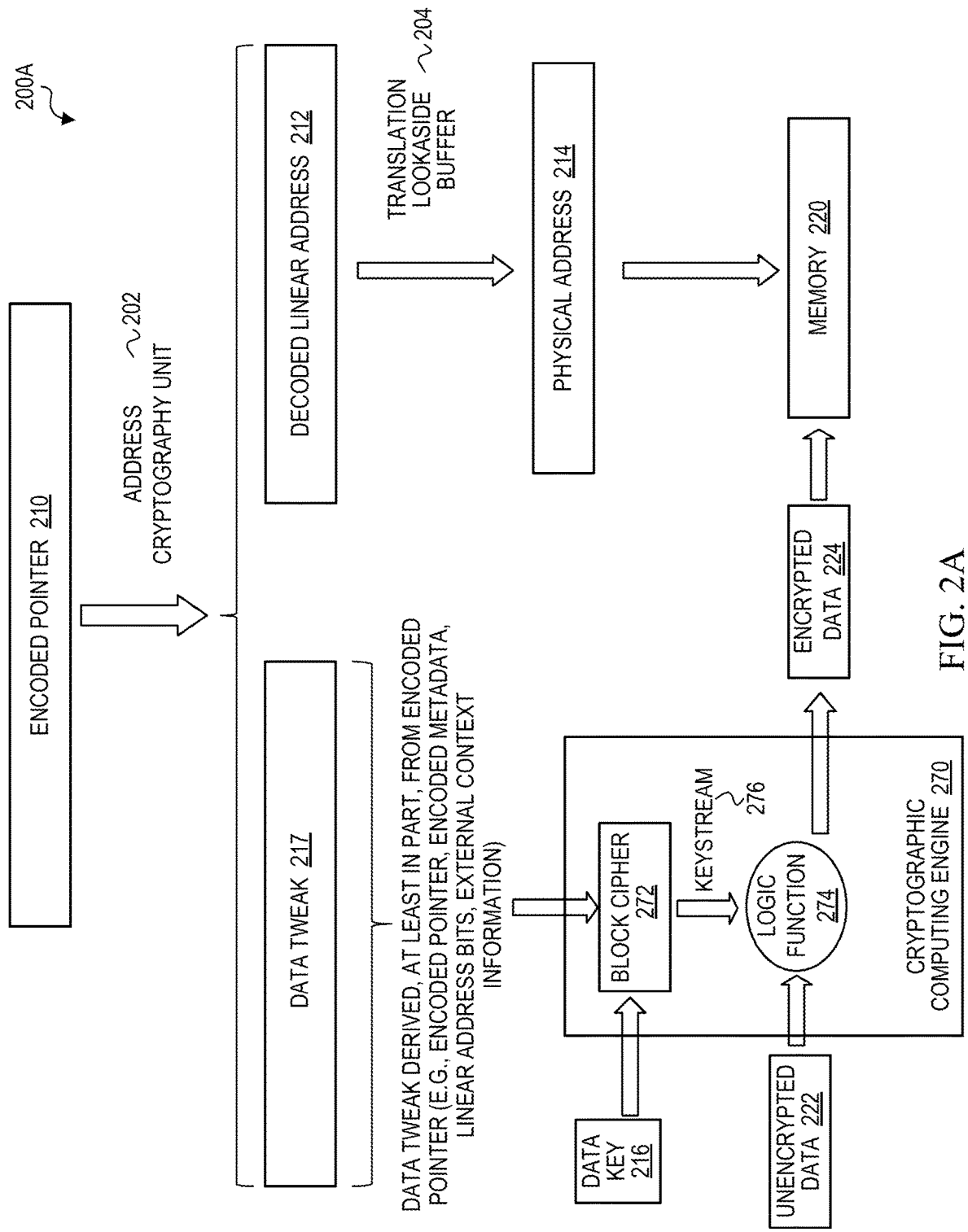
FIG. 2A is flow diagram illustrating a process of binding a generalized encoded pointer to encryption of data referenced by that pointer according to at least one embodiment of the present disclosure.

FIG. 2A is a simplified flow diagram illustrating a general process 200A of cryptographic computing based on embodiments of an encoded pointer 210. Process 200A illustrates storing (e.g., writing) data to a memory region at a memory address indicated by encoded pointer 210, where encryption and decryption of the data is bound to the contents of the pointer according to at least one embodiment. At least some portions of process 200A may be executed by hardware, firmware, and/or software of the computing device 100. In the example shown, pointer 210 is an example of encoded pointer 114 and is embodied as an encoded linear address including a metadata portion. The metadata portion is some type of context information (e.g., size/power metadata, tag, version, etc.) and the linear address may be encoded in any number of possible configurations, at least some of which are described herein.

Encoded pointer 210 may have various configurations according to various embodiments. For example, encoded pointer 210 may be encoded with a plaintext linear address or may be encoded with some plaintext linear address bits and some encrypted linear address bits. Encoded pointer 210 may also be encoded with different metadata depending on the particular embodiment. For example, metadata encoded in encoded pointer 210 may include, but is not necessarily limited to, one or more of size/power metadata, a tag value, or a version number.

Generally, process 200A illustrates a cryptographic computing flow in which the encoded pointer 210 is used to obtain a memory address for a memory region of memory 220 where data is to be stored, and to encrypt the data to be stored based, at least in part, on a tweak derived from the encoded pointer 210. First, address cryptography unit 202 decodes the encoded pointer 210 to obtain a decoded linear address 212. The decoded linear address 212 may be used to obtain a physical address 214 in memory 220 using a translation lookaside buffer 204 or page table (not shown). A data tweak 217 is derived, at least in part, from the encoded pointer 210. For example, the data tweak 217 may include the entire encoded pointer, one or more portions of the encoded pointer, a portion of the decoded linear address, the entire decoded linear address, encoded metadata, and/or external context information (e.g., context information that is not encoded in the pointer).

Once the tweak 217 has been derived from encoded pointer 210, a cryptographic computing engine 270 can compute encrypted data 224 by encrypting unencrypted data 222 based on a data key 216 and the data tweak 217. In at least one embodiment, the cryptographic computing engine 270 includes an encryption algorithm such as a keystream generator, which may be embodied as an AES-CTR mode block cipher 272, at a particular size granularity (any suitable size). In this embodiment, the data tweak 217 may be used as an initialization vector (IV) and a plaintext offset of the encoded pointer 210 may be used as the counter value (CTR). The keystream generator can encrypt the data tweak 217 to produce a keystream 276 and then a cryptographic operation (e.g., a logic function 274 such as an exclusive-or (XOR), or other more complex operations) can be performed on the unencrypted data 222 and the keystream 276 in order to generate encrypted data 224. It should be noted that the generation of the keystream 276 may commence while the physical address 214 is being obtained from the encoded pointer 210. Thus, the parallel operations may increase the efficiency of encrypting the unencrypted data. It should be noted that the encrypted data may be stored to cache (e.g., 170) before or, in some instances instead of, being stored to memory 220.

Figure 2B:
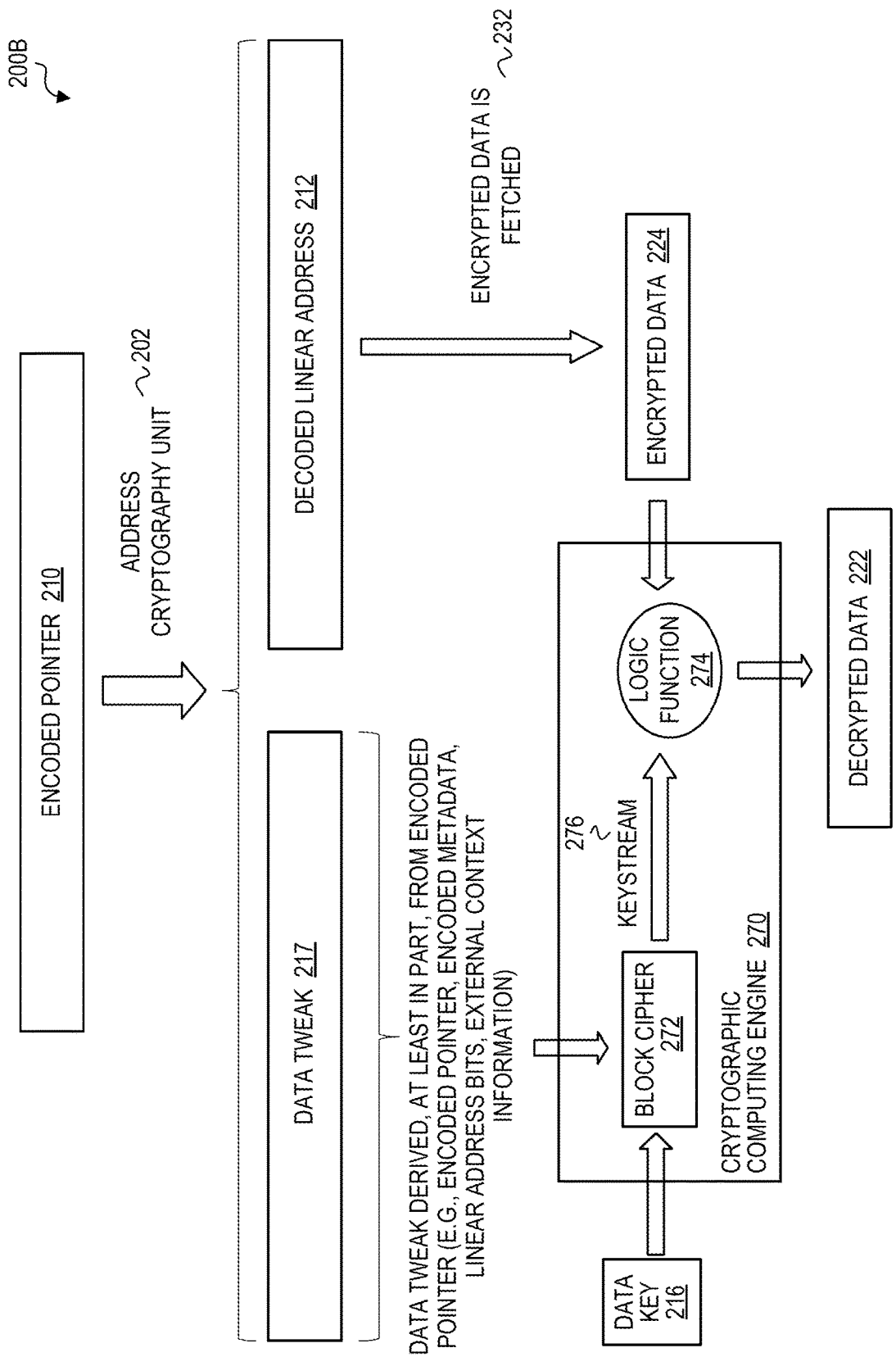
FIG. 2B is flow diagram illustrating a process of decrypting data bound to a generalized encoded pointer according to at least one embodiment of the present disclosure.

FIG. 2B is a simplified flow diagram illustrating a general process 200B of cryptographic computing based on embodiments of encoded pointer 210. Process 200B illustrates obtaining (e.g., reading, loading, fetching) data stored in a memory region at a memory address that is referenced by encoded pointer 210, where encryption and decryption of the data is bound to the contents of the pointer according to at least one embodiment. At least some portions of process 200B may be executed by hardware, firmware, and/or software of the computing device 100.

Generally, process 200B illustrates a cryptographic computing flow in which the encoded pointer 210 is used to obtain a memory address for a memory region of memory 220 where encrypted data is stored and, once the encrypted data is fetched from the memory region, to decrypt the encrypted data based, at least in part, on a tweak derived from the encoded pointer 210. First, address cryptography unit 202 decodes the encoded pointer 210 to obtain the decoded linear address 212, which is used to fetch the encrypted data 224 from memory, as indicated at 232. Data tweak 217 is derived, at least in part, from the encoded pointer 210. In this process 200B for loading/reading data from memory, the data tweak 217 is derived in the same manner as in the converse process 200A for storing/writing data to memory.

Once the tweak 217 has been derived from encoded pointer 210, the cryptographic computing engine 270 can compute decrypted (or unencrypted) data 222 by decrypting encrypted data 224 based on the data key 216 and the data tweak 217. As previously described, in this example, the cryptographic computing engine 270 includes an encryption algorithm such as a keystream generator embodied as AES-CTR mode block cipher 272, at a particular size granularity (any suitable size). In this embodiment, the data tweak 217 may be used as an initialization vector (IV) and a plaintext offset of the encoded pointer 210 may be used as the counter value (CTR). The keystream generator can encrypt the data tweak 217 to produce keystream 276 and then a cryptographic operation (e.g., the logic function 274 such as an exclusive-or (XOR), or other more complex operations) can be performed on the encrypted data 224 and the keystream 276 in order to generate decrypted (or unencrypted) data 222. It should be noted that the generation of the keystream may commence while the encrypted data is being fetched at 232. Thus, the parallel operations may increase the efficiency of decrypting the encrypted data.

Encoded Stack Pointers for Granular Stack Data and Control Flow Protections

Memory safety issues on the stack have been a cause of security vulnerabilities, both targeting adjacent data on the stack as well as control flow parameters such as the return address. Safety issues that permit a stack buffer overrun can provide read or write access to data on caller's stack frame and the return pointer, allowing a compromised callee to subvert control of the execution environment. Alternations to processor architecture can resist such safety issues from being exploited without altering software to remove these issues. This may be of particular interest to legacy software that cannot be easily modified to exclude these safety issues or recompiled with other known mitigations applied.

Current solutions for preventing such attacks include Control flow Enforcement Technology (CET), Stack Canaries (e.g., GNU Compiler Collection-fstack-protector), and compiler instrumented bounds checking. CET may guard against writing/modifying the return pointer, with no data protection being applied to read or write. In addition, CET may require that a metadata space be allocated expressly for storing duplicates of the return pointer, consuming memory and cache resources. Furthermore, CET may require recompilation of the software, and thus might not protect legacy binaries. Stack canaries may only guard against linear buffer write overruns, with reads not being protected. Also, random writes might not be protected. Programs must be recompiled to add stack canaries. The stack canaries increase the overhead of function calls and consume memory by adding canaries onto the stack. Compiler instrumented bounds require recompiling the program with added protections. It also imposes a high overhead of maintaining and checking bounds for pointer calculations or dereferences. Even using new instruction set architecture (ISA) extensions, the performance overhead of existing solutions can be overwhelming. Low fat pointers encode bound information in the pointer itself by reorganizing stack memories and allocations based on size, using compiler instrumented bounds and HW managed tags, etc. These protections, however, require recompiling the program or binary reinstrumentation.

Accordingly, embodiments of the present disclosure may utilize an encoded and/or encrypted stack pointer that is updated when entering or leaving stack frames. Among other encoded information, the encrypted stack pointer may contain immutable bounds constraining the operable range of that pointer to within its originating stack frame. Thus, data in each stack frame may be uniquely encrypted, and an encoded/encrypted stack pointer may only be used to access data in the frame to which it is associated. In some instances, an encrypted stack pointer can also be used as an Initialization Vector (IV) for uniquely encrypting data within the stack frame, providing data confidentiality and pseudo-integrity.

Aspects of the present disclosure may offer zero-touch protections for software containing stack memory safety and security issues, hence providing legacy binary compatibility. Certain aspects may include several different types of stack boundary protections previously offered while also adding new protections for data confidentiality and integrity, all with a lower resource and performance overhead than existing solutions, allowing platforms to be improved for both security and performance.

In some embodiments, one or more aspects of CET may be leveraged and/or improved upon. For example, in some embodiments, the CET shadow stack may be used to store frame metadata (e.g., 604 of FIG. 6) and/or a copy of the caller RSP (e.g., 602 of FIG. 6 or 702 of FIG. 7) and/or a copy of the final RSP (e.g., 704 of FIG. 7), in addition to the return address already in the CET shadow stack, for the purpose of maintaining backward compatibility with legacy binaries by not modifying the original call stack with additional variables.

As another example, a stack frame index may be specified in the RSP value to assist with locating in constant time the portion of the CET shadow stack that contains the metadata associated with the frame referenced by that RSP value, even if that is not the current frame. For example, the stack frame index may be relative to the base address of the CET shadow stack. The stack frame index may be included in the encrypted portion of the RSP value. The stack frame index may be decremented each time a new stack frame is created and incremented each time a stack frame is destroyed. Some embodiments may derive the stack frame index from the CET shadow stack pointer, e.g. by dividing the shadow stack pointer value by some amount such as the amount of information stored on the shadow stack for each stack frame. Some embodiments may store a frame upper bound in the CET shadow stack entry instead of in the decorated pointer (e.g., 402).

Further, some embodiments may store a copy of the version in the CET shadow stack entry and check that it matches the copy in the decorated pointer (e.g., 702) during dereferences, generating a fault in the case of a mismatch. Some embodiments may cache metadata from recently-accessed CET shadow stack entries in hidden registers for fast access.

Some embodiments may generate a fault if the stack frame index in a dereferenced pointer is lower than the stack frame index in the current RSP value, since that may indicate use of a stale pointer referencing a stack frame that is no longer valid.

Some embodiments may store a lower bound for the overall stack in the next entry position in the CET shadow stack. On a call, the lower bound may be shifted down in the CET shadow stack to make room for a new CET shadow stack entry. On a return, the lower bound may be shifted up to take the place of the CET shadow stack entry for the next-to-lowest CET shadow stack entry.

Some embodiments may encrypt the CET shadow stack by loading the register that specifies the CET shadow stack region with an encrypted pointer that is used to bind the data encryption of the CET shadow stack. That may avoid the need for using page table bits or bit encodings to specify protected pages that contain CET shadow stacks. That register may also be used to encode the current shadow stack pointer value without requiring a dedicated register for that purpose.

As used herein, a stack frame may refer to a range of contiguous linear addresses for holding state information associated with a function, as well as passing parameters and return values between functions during CALL and RET instructions.

Aspects of the present disclosure may be based on taking extra actions at the time of a CALL or RET instruction for entry and exit to a function. At CALL time, ISA may require software to have the Stack Pointer register (RSP) set to the bottom of the caller's frame. After pushing the return address onto the stack, the processor can treat the value of the stack pointer as the upper boundary for the new frame. References made in the callee's frame may generally not exceed this threshold. Alternative embodiments may grow stacks towards higher addresses, in which case the value of the stack pointer after pushing the return address onto the stack could be treated as the lower boundary for the new frame, and other aspects of this invention that are dependent on the direction of stack growth could be similarly reversed.

The upper boundary of the frame will be encoded into the callee's stack pointer prior to completion of the CALL instruction. The upper bits of the stack pointer will be used to store the upper boundary. These bits are available because the majority of the stack pointer bits never change; on Windows a typical stack limit is 64 MB, on Linux 8 MB per process. These static bits may be stored off to the side in a register shared for the entire stack. The current value of the stack pointer is pushed onto the stack to be used later in the RET instruction and to unwind the stack.

Figure 3:
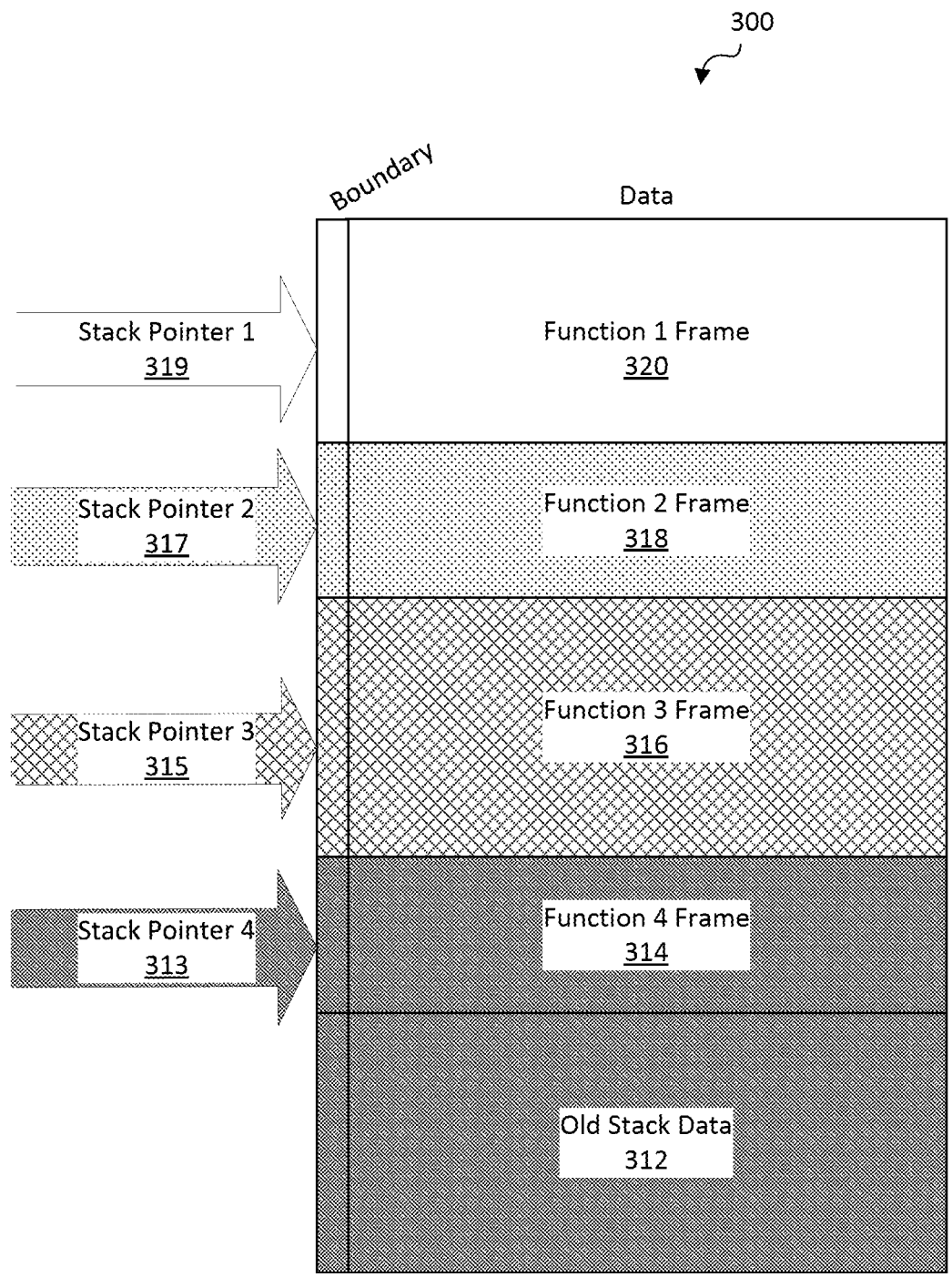
FIG. 3 illustrates example frames on a stack and corresponding encoded stack pointers in accordance with embodiments of the present disclosure.

FIG. 3 illustrates example frames (314, 316, 318, 320) on a stack 300 and corresponding encoded stack pointers (313, 315, 317, 319) in accordance with embodiments of the present disclosure. In the example shown, Function 1 calls Function 2, which calls Function 3, which calls Function 4, and each Function stores its own data on the stack 300 in respective frames. Each frame has a unique corresponding stack pointer, and the stack pointer is bounded to its corresponding frame. For instance, in the example shown, the stack pointer 319 corresponds to frame 320 for Function 1, the stack pointer 317 corresponds to frame 318 for Function 2, the stack pointer 315 corresponds to frame 316 for Function 1 and the stack pointer 313 corresponds to frame 314 for Function 4. There also exists old stack data 312 from a previous function call.

The stack pointers may be encoded as described herein and may contain boundary information for the frame. In some instances, the encoded stack pointer may be used as an initialization vector (IV) for encryption of the frame data; that is, data in each frame may be uniquely encrypted based on its corresponding encoded stack pointer such that it is only accessible using the frame's corresponding stack pointer. In the example shown in FIG. 3, for instance, the Function 1 may access frame data in frame 320 using the encoded stack pointer 319; however, other functions may not access the data in frame 320 as the pointers 313, 315, 317 will decode in such a way that does not allow access to the data in frame 320. In the example shown, Function 4 may overwrite the old stack data 312 as needed, but may not access the old stack data 312 as the corresponding pointer(s) to the old stack data 312 is no longer available (e.g., has been destroyed).

Figure 4A:
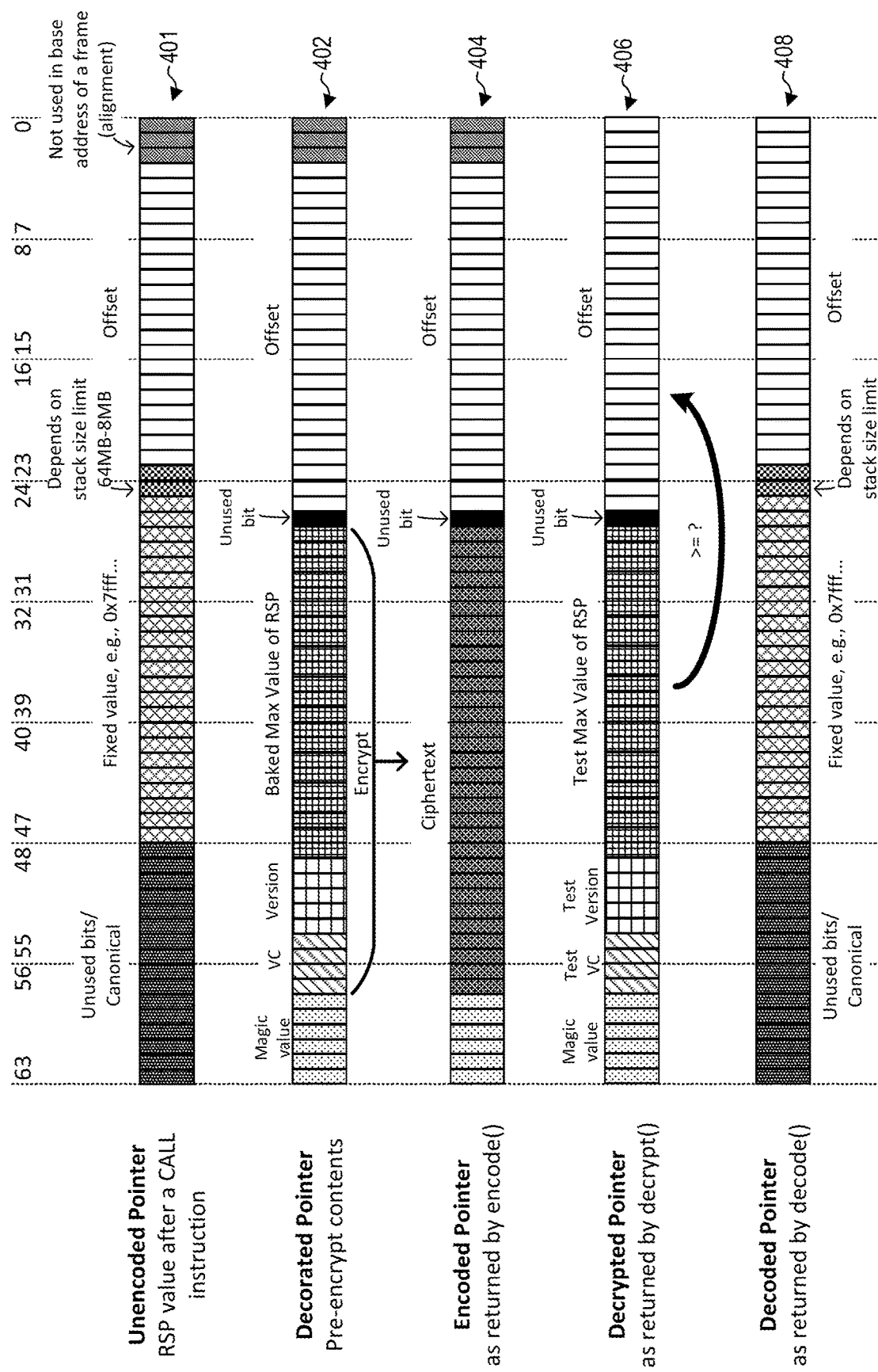
FIGS. 4A-4B illustrate example stack pointer formats that may be used in certain embodiments of the present disclosure.

FIG. 4A illustrates example stack pointer formats that may be used in certain embodiments of the present disclosure. In accordance with embodiments of the present disclosure, an encoded or decorated stack pointer (e.g., 402) may be constructed from an unencoded stack pointer (e.g., 401). As shown, the canonical/non-canonical reserved range of the pointer, e.g., bits 48-63, can be used in the decorated pointer, as this pointer may only be handled in architectural registers and these changes do not include widening the memory bus.

Accordingly, in certain embodiments (e.g., as shown), the topmost bits of the decorated pointer 402 may include a magic value (e.g., in 6 bits as shown) that can be used to indicate this pointer is an encoded stack pointer (i.e., identifying the encoded pointer as being distinct from other types of encoded pointers) and may encode other information. In addition to the magic value, depending on the encoding scheme, a fixed or computed Validation Code (VC) may also be encoded in the decorated pointer 402 (e.g., in the next 4 bits as shown). The VC may be used to detect malicious corruption of the pointer, for example. The VC may also provide resistance from replay in some instances. Further, version information may be incorporated in the decorated pointer as well (e.g., in next 5 bits as shown), for example, to mitigate call trees being extremely repetitive. Because the same base addresses of stack frames will be reused many times in a program, additional entropy may be added by the version information to ensure that the reused stack is encrypted differently than the previous encryption scheme with an older version.

Additionally, a baked maximum offset/max RSP value may be encoded in the decorated pointer 402 (e.g., in 22 bits as shown). This value may include or indicate the address of the top of the frame recorded after the CALL instruction has finished executing (e.g., RSP max 608 in FIG. 6). Including this baked value in the encoding of the pointer may prohibit the pointer from accessing a higher address than the top of current frame, preventing stack pointers created in this frame from accessing data in prior frames. As the program executes, this value may be reduced such that the current frame can only access its own space and below; that is, passed pointers from prior frames can only open their frames and below. The base address of the frame may also be used as a source of variance for stack data encryption in some instances.

An encoded pointer can then be generated from the decorated pointer. In some embodiments, for example, the encoded pointer (e.g., 404) contains the same contents of the decorated pointer (e.g., 402), but with certain bits of the decorated pointer (e.g., the VC, version information, and baked maximum value of 402) being encrypted to prevent user software from tampering with the pointer's encoded data. The encryption may be performed using a block cipher, in some embodiments. Generally, a block cipher may refer to an encryption algorithm that uses a symmetric key to encrypt a block of data in a way that provides confidentiality with properties such as bit diffusion and confusion that are important for preventing an adversary from predictably manipulating the decrypted address slice. At least some block cipher embodiments include an initialization vector (IV), which may include a fixed-size input that is random, pseudorandom, or nonrepeating, depending on the particular block cipher requirements. The encryption thus diffuses encrypted information across all bits in the ciphertext portion of the encoded pointer. The encryption can be performed as described above with respect the FIG. 2A, in some embodiments. In some embodiments, the block size may be too small to fit the entirety of the pointer elements that need to be made immutable. The pointer elements or portions thereof that do not fit may be kept as plaintext in the encoded pointer and passed as a tweak to the block cipher.

The encoded pointer may then be loaded into the stack pointer register (RSP). Software may subtract from the offset region of the pointer and perform conventional pointer arithmetic to access data stored on the stack frame.

In some embodiments, the pointer's format can be adjusted so that version information is encoded in the upper bits of the plaintext portion of the pointer. These bits may be incorporated as additional IV bits in the data encryption, or as tweak bits if tweakable encryption is used. In some embodiments, a pointer authentication code (PAC) could be included in the space originally allocated to the version information in the encrypted/ciphertext region of the pointer as shown in FIG. 4A. However, in other embodiments, a PAC may occupy a different set of bits. A pointer authentication code may include a message authentication code (MAC) embedded in a region of the pointer. The pointer authentication code may be computed over the address portion of the pointer, and may also incorporate context information in certain instances.

Figure 4B:
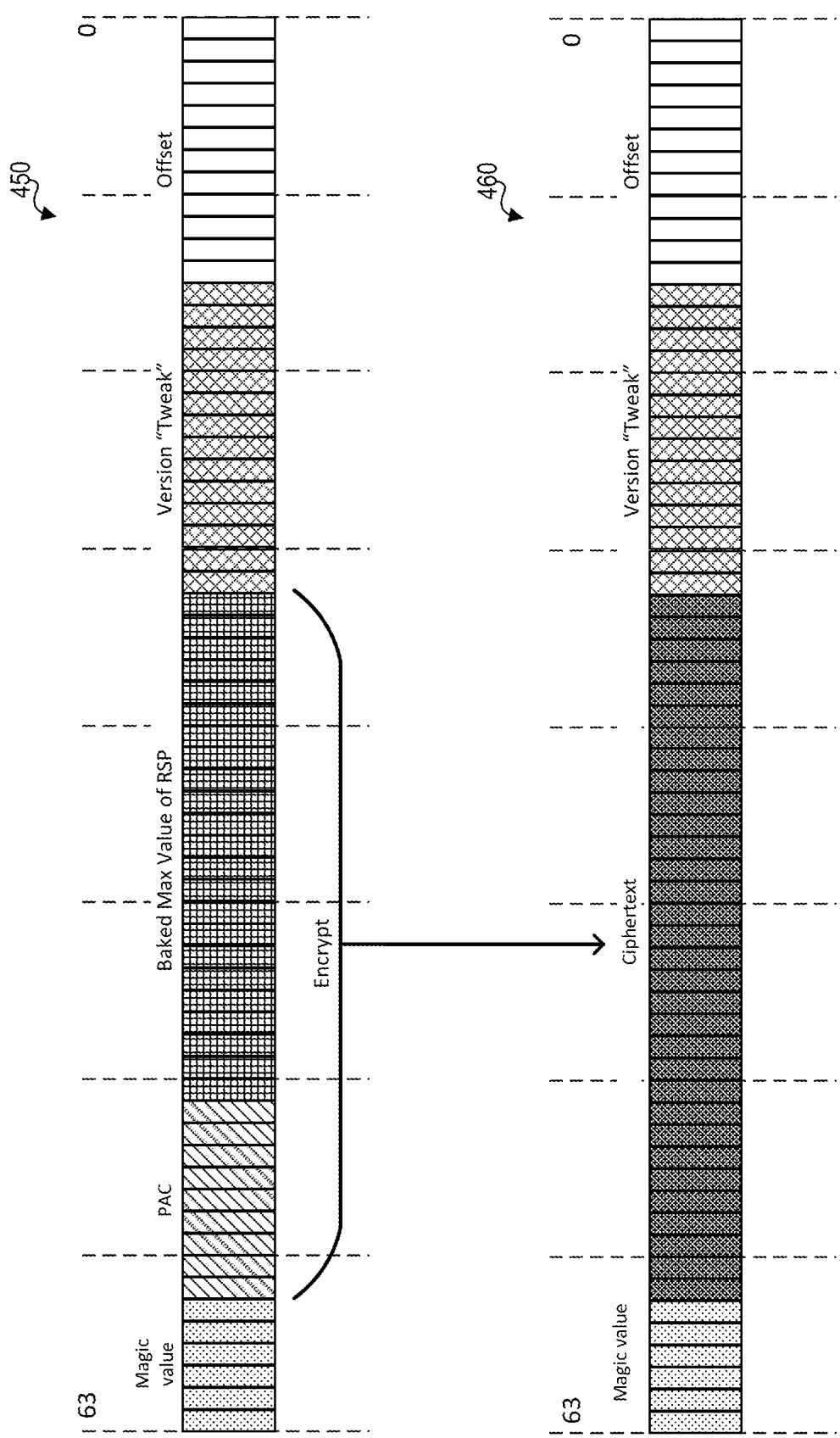

FIG. 4B illustrates another example encoding of a pointer in accordance with embodiments of the present disclosure. In particular, the example pointer 450 of FIG. 4B includes both the PAC and the version information as described above, but with each having more bits allocated to them, potentially increasing their efficacy. Further in the example shown, the PAC occupies the upper region of the ciphertext portion of the encrypted pointer 460 while the version information occupies the upper bits of the plaintext portion of the encrypted pointer 460.

In some scenarios, certain of the lower bits of the pointer may be duplicated in the upper bits. Accordingly, in some embodiments, the baked maximum offset portion may be used to store bits that do not change in the offset portion of the pointer.

Figure 5A:
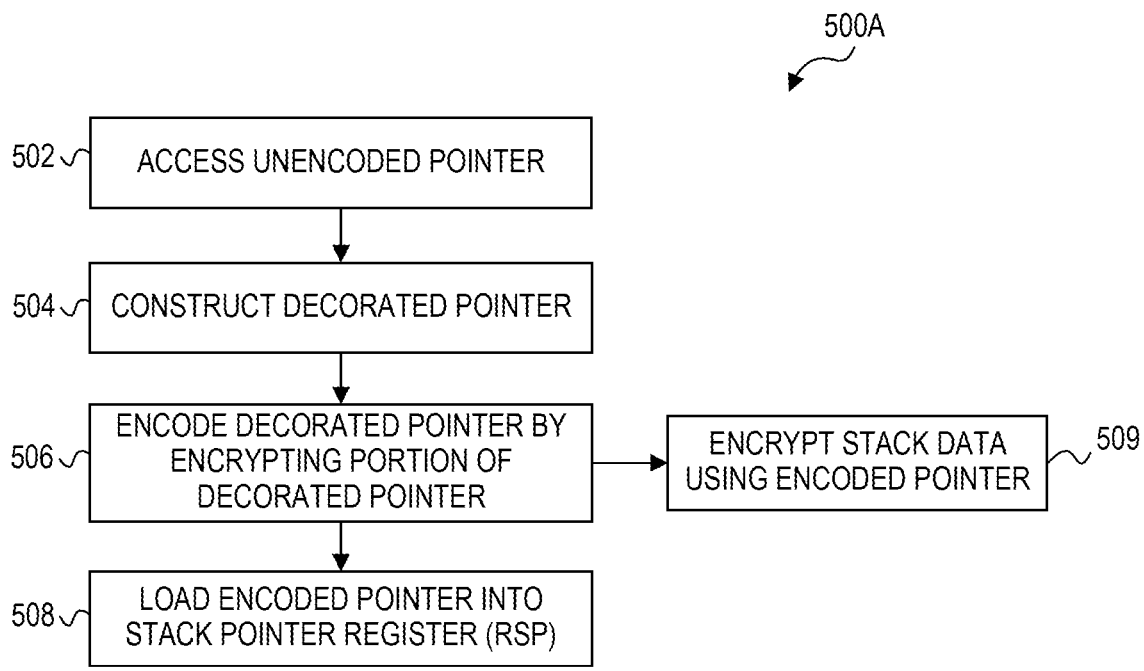
FIGS. 5A-5B illustrate flow diagrams of example processes for using stack pointers (e.g., those in FIGS. 4A-4B) in accordance with embodiments of the present disclosure.
Figure 5B:
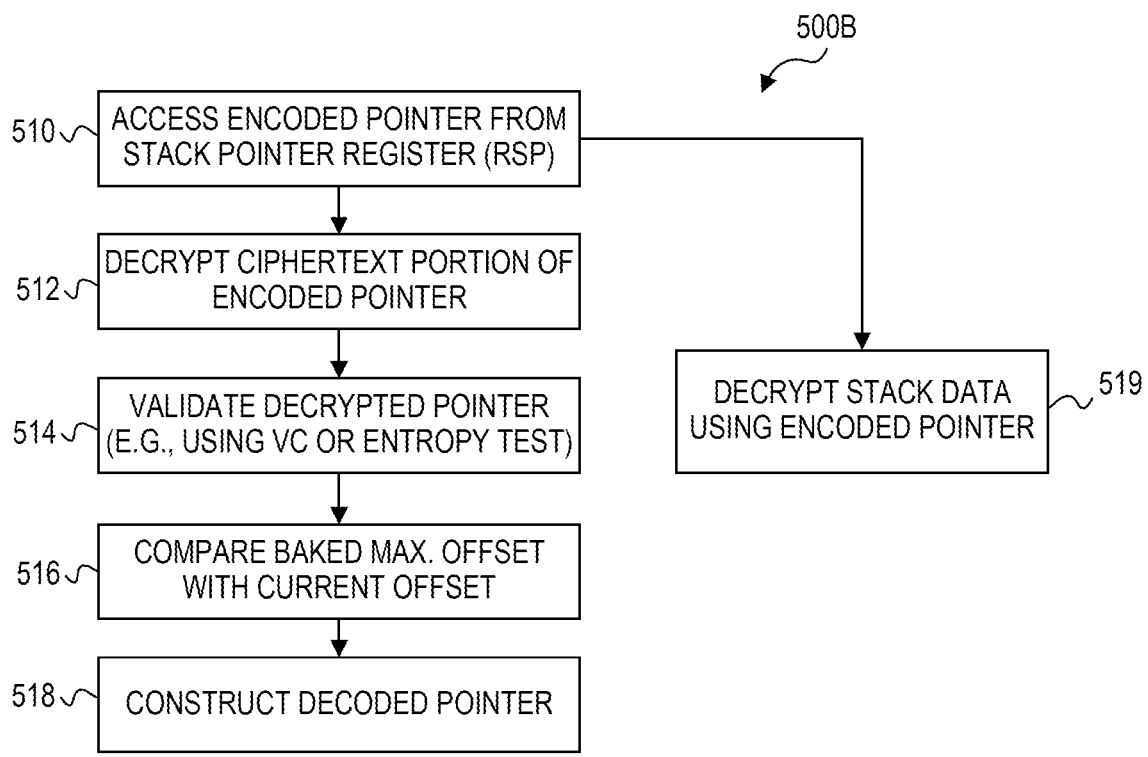

FIGS. 5A-5B illustrate flow diagrams of example processes 500A, 500B for using stack pointers (e.g., those in FIGS. 4A-4B) in accordance with embodiments of the present disclosure. One or more aspects or operations of the example processes may be implemented by processor circuitry, such as execution circuitry. The example processes may include additional or different operations, and the operations may be performed in the order shown or in another order. In some cases, one or more of the operations shown in FIGS. 5A-5B are implemented as processes that include multiple operations, sub-processes, or other types of routines. In some cases, operations can be combined, performed in another order, performed in parallel, iterated, or otherwise repeated or performed another manner.

When data is to be stored in a stack frame, e.g., based on a CALL instruction, a stack pointer may be generated and encoded according to the example process 500A. At 502, an unencoded pointer (e.g., the unencoded pointer 401 of FIG. 4A) is accessed or otherwise obtained after generation. At 504, a decorated pointer (e.g., the decorated pointer 402 of FIG. 4A) is constructed. The contents of the decorated pointer may be as described above with respect to FIGS. 4A-4B, in some embodiments. For example, the decorated pointer may include a magic value, VC, PAC, version information, and/or baked maximum value of the RSP as described above. At 506, the decorated pointer is encoded by encrypting at least a portion of the decorated pointer, resulting in an encoded pointer (e.g., the encoded pointer 404 of FIG. 4A). The encryption may be performed using a block cipher, such as an AES-based block cipher, in some embodiments. At 508, the encoded pointer is loaded into the stack pointer register (RSP).

In some embodiments, data may be encrypted using all or part of an encoded pointer at 509. The encryption can be performed in a similar manner as described above with respect the FIG. 2A, in some embodiments. For example, a portion of the encoded pointer may be used as a tweak or initialization vector (IV) for encryption of the data to be stored in the corresponding frame of the stack. The portion may include the upper portion of the pointer, including the ciphertext portion. The data encryption may ensure confidentiality and pseudo-integrity in the cases where boundary checking cannot be used to verify the validity of a reference. Confidentiality may be provided by the data encryption, whereas integrity may be provided because invalid writes will write data with the incorrect IV, thereby uncontrollably corrupting data. Lacking control will reduce an adversary's ability of obtaining desirable results and increase the chance of crashing a program. The encoding of the pointer, using the address and version as a tweak, may ensure unique confidentiality properties for each stack frame.

Later, the encoded stack pointer may be used to access stack data, and the example process 500B may be used to decode the encoded stack pointer. At 510, the encoded pointer (e.g., the encoded pointer 404 of FIG. 4A) is accessed from a stack pointer register. At 512, the ciphertext portion of the encoded pointer is decrypted to yield a decoded pointer (e.g., the decrypted pointer 406 of FIG. 4A). The decryption process can be performed in a similar manner as described above with respect to FIG. 2B, in some embodiments.

At 514, the decrypted pointer is validated. For example, VC or PAC information in the decrypted pointer may be validated. For instance, in some implementations, the Validation Code (VC) or PAC of the decrypted pointer may be tested to ensure mutation has not occurred. This is because an attacker flipping bits of the ciphertext of the encoded pointer without knowledge of the key will cause decryption of the pointer ciphertext to be uncontrollably garbled. That is, if the encrypted portion of the pointer is mutated in any way (e.g., by an adversary), the decrypted data should be uncontrollably random and thus, the validation step will fail. In some cases, the VC may be set to all zeroes, and if any decoded VC value includes a one then it may be determined that the pointer was altered and should be deemed invalid. In some cases, the VC or PAC may include a MAC. In such cases, a hash or sum of the other fields in the encrypted slice of the pointer may be generated (e.g., the version and Max RSP fields). The same calculation is performed when decorating and decrypted the pointer. If the MAC does not match when decrypting the pointer, then this pointer must have been altered and should be deemed invalid.

In some embodiments, an entropy test may also be used to determine if some bits with expected low entropy have been garbled. While the above approaches for validation involve bits taken from the pointer to authenticate the pointer, there is a way to leave those bits available for other use and still detect corruption. For instance, the pointer can be examined to determine if the encrypted fields (after decryption) seem like they are garbled. Again, if an attacker tried to modify the ciphertext, all of the fields would be uncontrollably random when decrypted. Algorithms that measure randomness, or "entropy" can be used to determine if the decrypted ciphertext has too high of an entropy. If so, then it could be an indication the pointer was altered and may be determined to be invalid.

At 516, the baked maximum offset in the decrypted pointer may be compared to the offset of the decrypted pointer. If the current offset is higher than the maximum, an exception may be generated for invalid access, implying the stack pointer is trying to access beyond the upper bounds of the current stack frame.

In some embodiments, the amount of data being accessed by the current instruction may be added to the current offset in the decrypted pointer prior to comparing it to the baked maximum offset. Some embodiments may allow read-only access to the return address of a frame referenced by a pointer to that frame for software compatibility purposes. Some embodiments may detect read accesses to return address storage locations and actually load the unencoded return addresses even if those storage locations contain encoded forms of the return addresses or non-address metadata. Some embodiments may use a particular type of memory load instruction or a prefix applied to an existing type of memory load instruction to indicate that the unencoded return address should be loaded from the return address storage location, and ordinary memory load instructions could read the encoded return address from that location. For example, an exception handler routine may use an unencoded return address to look up information in a table indexed by code locations, whereas a setjmp routine may load an encoded return address to be stored in a buffer for later use by a longjmp routine. Some embodiments may generate a fault if a decorated pointer 402 is dereferenced that has a baked maximum offset lower than the baked maximum offset in the current RSP value, since that may indicate use of a stale pointer referencing a stack frame that is no longer valid.

If no faults are generated by 514 or 516, then a decoded pointer (e.g., the decoded pointer 408 of FIG. 4A) is constructed at 518. This may include restoring a fixed value portion of the pointer. For example, the fixed value portion of the stack pointer may be restored from the shared register. The decoded pointer may then be passed to the memory pipeline as the address for handling the memory access event, e.g., for accessing stack data. On a RET instruction, the caller's value of the stack pointer may be popped from the stack.

In some embodiments, the stack frame data may be encrypted using the encoded stack pointer as described above. In such embodiments, the stack frame data may be decrypted at 519 using the encoded stack pointer. For example, the portion of the encoded pointer used in encrypting the data may be used as an IV for decrypting the data as well. The decryption process can be performed in a similar manner as described above with respect the FIG. 2B, in some embodiments.

Some embodiments may check for a pointer in the format of an encoded pointer (e.g., similar to 404) being passed as the destination of an indirect jump instruction, e.g., as may occur in a longjmp software routine, and adjust its operation to match the effects of pushing the provided encoded pointer onto the stack and executing a return instruction. In alternative embodiments, software routines that may pass an encoded pointer 404 to indirect jump instructions may be modified to instead push the encoded pointer 404 onto the stack and execute a return instruction.

Return Pointer Encoded Unwind Information

The above suggests pushing the caller's value of the stack pointer onto the stack during the CALL instruction and popping on the RET instruction. This can consume space on the stack that legacy compilers are not expecting, potentially introducing compatibility issues. Accordingly, in some embodiments, the size of the caller's frame (e.g., absolute or relative to the bottom of the stack) can be encoded in the upper bits of the return address (RA) pointer. This does not consume additional stack resources and hence, does not alter the layout of the stack.

In some embodiments, the distance to a previous stack frame base recorded in the return vector on a CALL as the distance to the previous (caller's) frame's base (2^16 bytes) may be a smaller number than the base encoding itself, whose size is dependent on the entire stack size. Only the caller's frame distance may need to be stored because the next frame will have a different base and the data encryption provides confidentiality as the next frame will be encrypted differently, given its data will be encrypted with a different encoded base frame in the RSP (confidentiality preserved). Data integrity will also provide detection of tampering in this case too.

Some embodiments that maintain a CET shadow stack pointer, e.g. in a register, regardless of whether they also actually maintain a shadow stack, may unwind a corresponding number of stack frames in a step-by-step fashion with the number specified as an operand in an INCSSP instruction that increments the shadow stack pointer. For example, this may be beneficial for software compatibility with setjmp/longjmp and exception handling features in various programming languages.

Inline Frame Metadata

The above suggests pushing the caller's value of the stack pointer onto the stack during the CALL instruction and popping on the RET instruction. If this is allowed, then more data about each frame may be pushed onto the stack. This data can be retrieved by using the baked maximum offset stored in any stack pointer originating in each frame, plus fixed offsets for each metadata stored.

If the processor needs to save additional parameters (e.g., metadata) to the stack unbeknownst to the compiler, it is possible to hide those parameters in order to preserve the application binary interface (ABI) of passing arguments on the stack. There, the callee will access the caller's stack frame at specific relative offsets from the caller's base frame. The process will allow this to access the stack arguments for just the adjacent frame boundary. The relative offsets can be maintained by the processor by automatically subtracting the metadata region when moving into the adjacent frame. In this case, the memory load and store operations will again be aligned to those assumed by the compiler without the addition of extra metadata on the stack.

Figure 6:
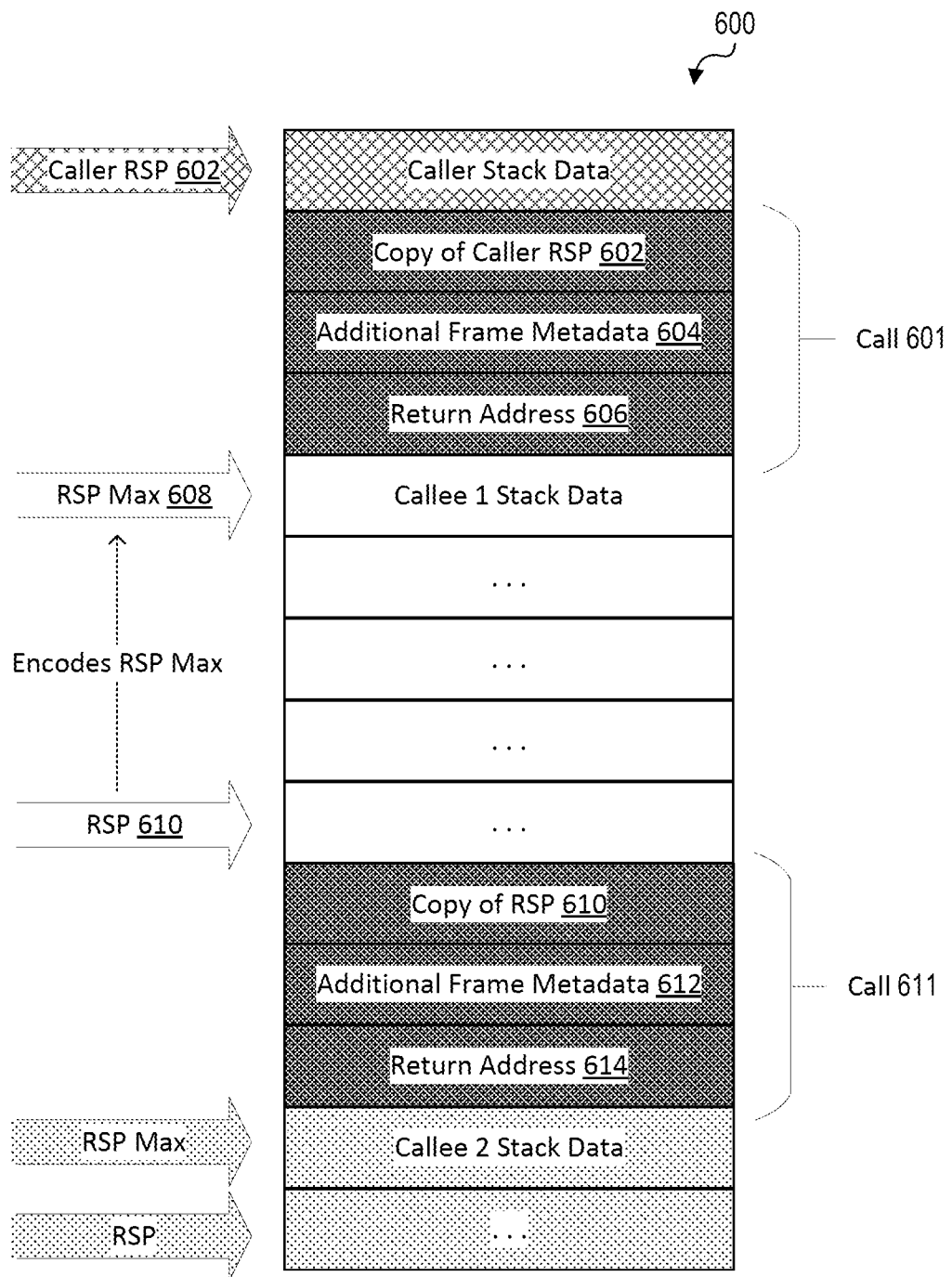
FIG. 6 illustrates an example stack with inline frame metadata in accordance with embodiments of the present disclosure.

FIG. 6 illustrates an example stack 600 with inline frame metadata in accordance with embodiments of the present disclosure. In the example shown, each frame includes a set of data that is uniquely encrypted based on encoded stack pointers (as indicated by the respective shadings). For instance, the caller stack data is encrypted based on the encoded caller RSP 602. The encoded stack pointers (e.g., 602, 608, 610) may be encoded as described above, in certain embodiments. For instance, in the example shown, the RSP 610 encodes the value of RSP Max 608 as its Baked Max RSP Value.

In some embodiments, call information in a stack can include frame metadata (e.g., a copy of the caller's RSP and/or other frame metadata) along with the return address. For instance, in the example shown, the call information 601 includes a copy of the last caller RSP 602 along with additional frame metadata 604 and the return address 606. The callee function associated with the call information 601 (Callee 1) places data on the stack 600. As shown, the first stack pointer of the callee data (RSP Max 608) is encoded in subsequent stack pointers (e.g., RSP 610) as described above (e.g., as the Baked Max Value of RSP). Another function (Callee 2) is called with call information 611, and a copy of the RSP value 610 is stored in the call information 611 along with additional frame metadata 612 and the return address 614. The Callee 2 then stores data on the stack 600 similar to Callee 1, with subsequent stack pointers encoding the RSP max value.

Lower Bounds Information for Stack Data Passed by Reference

Inline frame metadata can be used, in some embodiments, to prevent underrunning pointers from higher frames. For example, in some instances, a copy of the final RSP of each frame (e.g., 708 for Callee 1's frame) can also be stored in the frame metadata region along with the caller's RSP (e.g., 702) and the return address (e.g., 706). When a stack pointer is passed from a higher frame, it may retain the encoded stack pointer of the originating frame. As the upper portion of this pointer does not match the current RSP, when dereferenced it can be concluded this pointer came from another frame and the frame metadata can be retrieved from the originating frame to determine a lower boundary for that pointer. Thereby, this passed reference can only be used to access memory in the originating given frame; access is bounded on upper and lower boundaries. Some embodiments may use a final RSP that excludes access to the return address of the callee whose activation caused the final RSP to be recorded.

Figure 7:
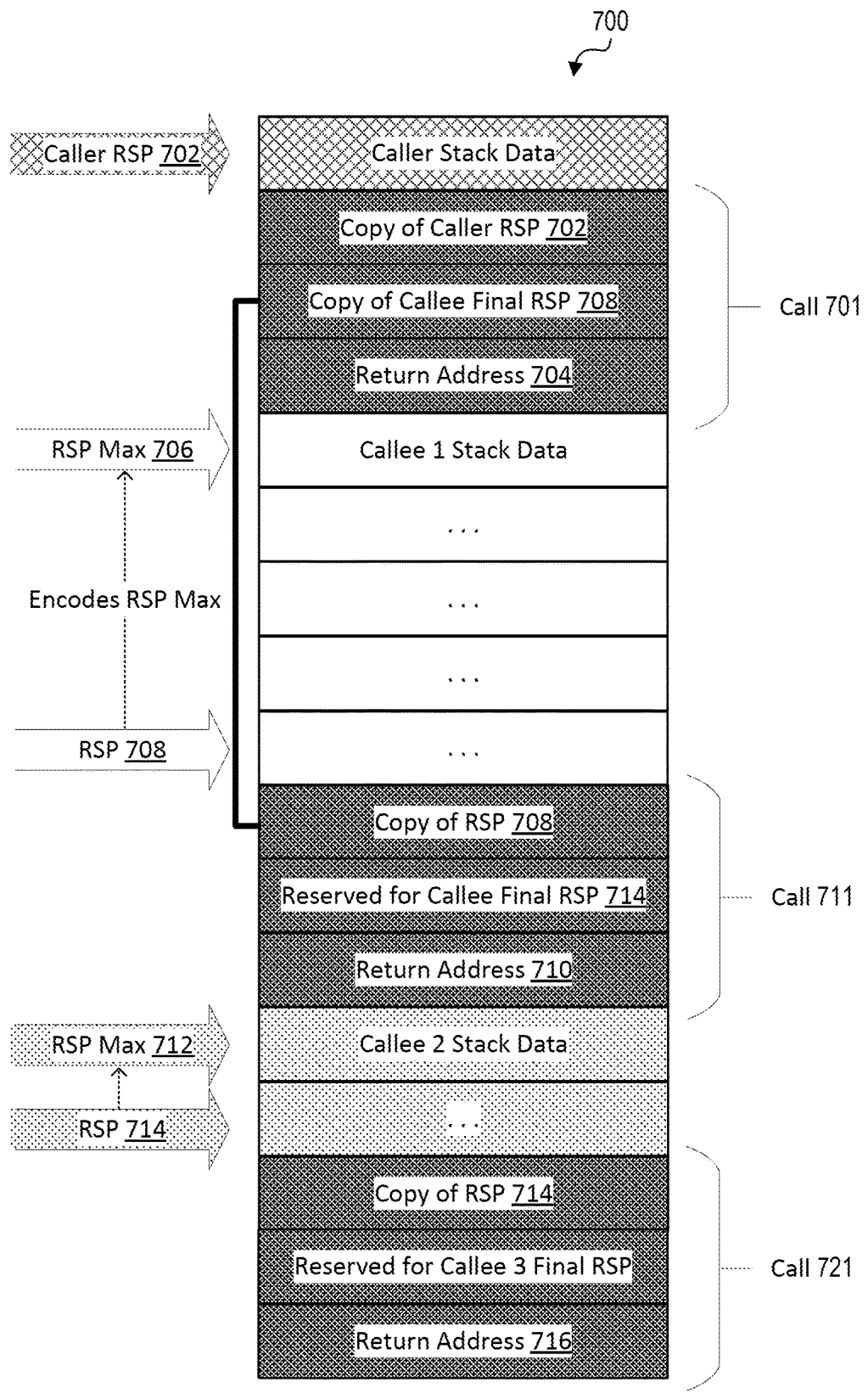
FIG. 7 illustrates an example stack with stack data bound information in accordance with embodiments of the present disclosure.

FIG. 7 illustrates an example stack 700 with stack data boundary information in accordance with embodiments of the present disclosure. In the example shown, a caller calls Callee 1 and stores in the call information 701 a copy of the caller's RSP 702 along with the return address 704. In addition, space is reserved for storage of the final RSP of the callee's final RSP 708 as shown (which is populated in the reserved stack space once it is known). Callee 1 places data on the stack using encoded stack pointers (e.g., RSPs 706, 708 (which encodes the max RSP of the frame 706 as described above)). Callee 1 calls Callee 2 and stores in the call information 711 a copy of Callee 1's final RSP 708 along with the return address 710. As before, space is reserved for storage of Callee 2's final RSP 714. Callee 1 places data on the stack using encoded stack pointers (e.g., RSPs 712, 714 (which encodes the max RSP of the frame 712)). Then, Callee 2 calls Callee 3 and stores in the call information 721 a copy of Callee 2's final RSP 714 along with the return address 716, and space is reserved for storage of Callee 3's final RSP once known.

Some embodiments may store the final RSP information somewhere else in the stack or frame and/or encode the offset of that region in the return address (e.g., 706). For efficiency, this boundary information may be accessed infrequently, if cached in a register while within a given stack frame. Specifically, in some embodiments, the RSP copy, the metadata, or the boundary information may be stored in one or more new General-Purpose Registers (GPRs) dedicated to holding stack protection information. Furthermore, when a reference to an object in an inactive stack frame is placed in a first General Purpose Register, a bit vector, stored as part of the CPU core state, may be set to indicate that a second General Purpose Register holds RSP copy, metadata, or bounds information associated with the referenced object.

Protecting Stack-Passed Arguments

The processor may track when a callee (or callee's callee, etc., to arbitrary depths) is accessing parameters on the caller's stack using a high-water mark, which may be tracked using the metadata described above. If a function passes a pointer to its local data, whoever uses that pointer will be accessing the data on the pointer's referenced stack frame. The processor will also allow access past the base of that pointer's base, using the above saved RSP metadata (or offset metadata encoded into the return address stored at the stack frame boundary) at the base position to find the adjacent frame's base, but the processor will only allow this access into the adjacent frame and no farther. In this case, the processor can also track any writes into the adjacent frame and store information about the writes (e.g., how far the writes reached into the caller's frame) to determine if any local variables were corrupted. For instance, a caller may access the high-water mark that tracked how high up into its frame a callee function accessed/wrote, and determine whether the callee function accessed/wrote to the caller's local variables. For example, the caller should not need to access variables below the high-water mark set by the callee's accesses, so the caller attempting to access data below the high-water mark may be an indication of a potential malicious access. If it is determined that the callee potentially wrote to the caller's local variables, then the data may have been maliciously corrupted or replaced and the caller function may accordingly choose to not access such data and/or may generate a fault.

In some instances, the callee can track argument accesses. The callee can read arguments on the caller's stack frame using the caller's base frame. If the callee overwrites an argument, then the processor may encrypt that argument using the callee's base frame, and may re-encrypt all the arguments up to the base frame, saving this as the high-water mark in the callee's metadata (e.g., 604 of FIG. 6). If the callee subsequently overwrites a higher argument, the high-water mark boundary may be raised even higher. Based on the high-water mark, the processor will know which base to use to read the argument (caller's or callee's). If the callee overwrites the caller's local variable, that will also get re-encrypted with the callee's base. Because the caller will again use its base to decrypt locals, it will get corrupted results on a read if there was an overwrite (which prevents the callee from deterministically modifying the caller's local variables). Data integrity mechanisms can also detect this case in a way that is consistent with the heap. Some embodiments may raise the high-water mark and re-encrypt the data that is newly covered by that high-water mark when that data is read.

Some embodiments may not re-encrypt the caller's spilled stack arguments but instead track the high-water mark location into the caller's stack frame. This high-water mark information can be stored in the frame metadata or in unused return address bits stored for the caller function. When the processor then executes a return (RET) instruction, it will use the high-water mark to replace the ciphertext values of the accessed arguments up to the high-water mark to a value indicating they were accessed by the callee, or as uninitialized memory values. In this way, if the caller attempts to read (load) those values as it would it's local stack frame variables, the processor can trigger an exception (caught by an exception handler), fault or other error to indicate possible tampering or leakage of the caller's local stack variables by a callee function. Meanwhile, the processor will allow the caller to overwrite (store) new data to these stack locations. This is because arguments passed by a caller to a callee are not read again by the caller, but may be overwritten by the caller to extend the local variables or as arguments to a new callee. Some embodiments may lower the high-water mark for the current stack frame when local allocations below the current high-water mark are written, such that the new value of the high-water mark is just below the lowest byte that was newly written.

Metadata Encoded in Stack Pointers

In some embodiments, the return address can be used to encode the frame metadata and/or caller RSP in order to maintain legacy code compatibility by not modifying the call stack as the return address is compatible with legacy software binaries ABI where it is already part of the call stack. For example, unused bits (e.g., the non-canonical bits in a 64-bit linear address) in the return address may be used to indicate the offset to the top of the caller's stack frame as described below. From this offset, the processor may calculate the correct caller stack pointer on a return (RET) instruction, allowing the processor to use the correct base encoded cryptographic stack pointer for the caller's frame when returning from a function call.

Some embodiments may rely on constraints of typical ABI-defined code models to make additional bits in return addresses available for use to store metadata such as a high-water mark. For example, the typically-used "small" code model defined in the ABI requires that the code and globals for a software module fit within a 2GiB region. That region may be required to be 2GiB-aligned.

Figures 8A, 8B:
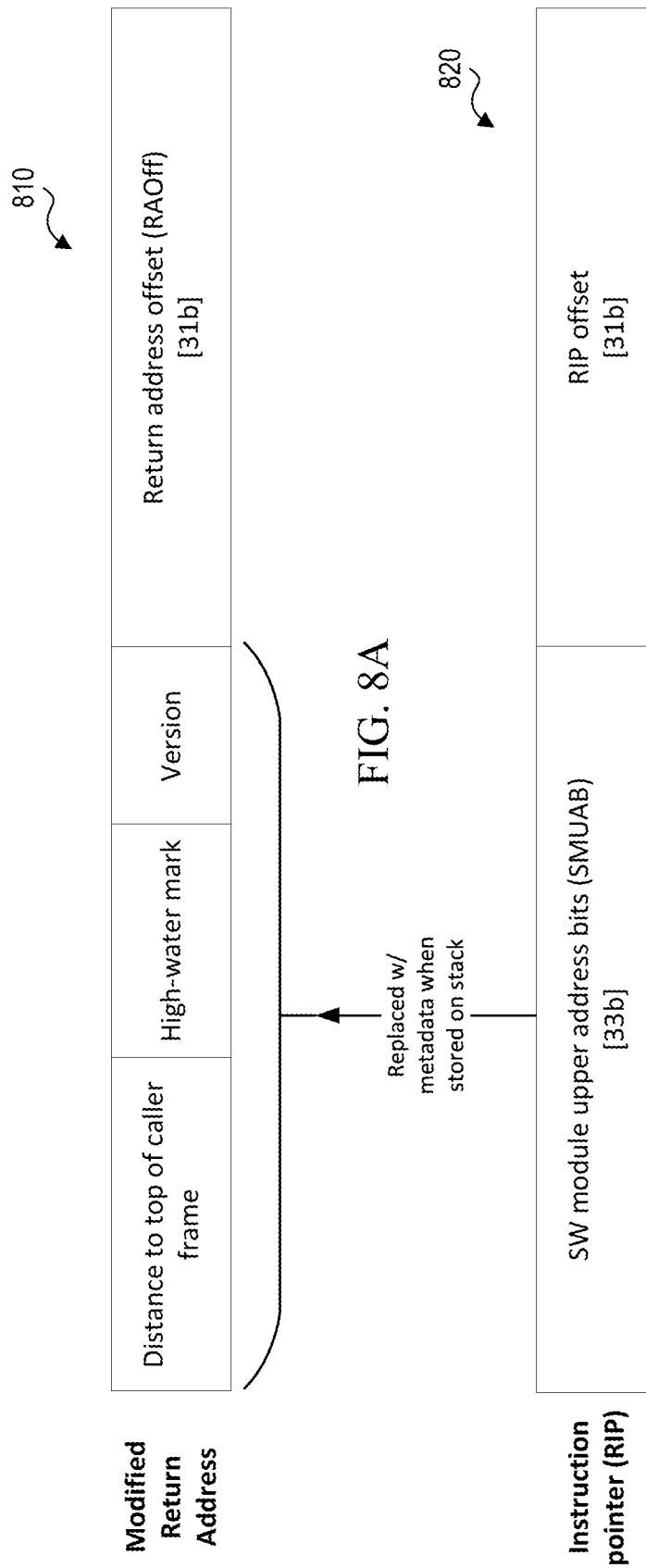
FIGS. 8A-8C illustrate an example of pointer-encoded metadata in accordance with embodiments of the present disclosure.
Figure 8C:
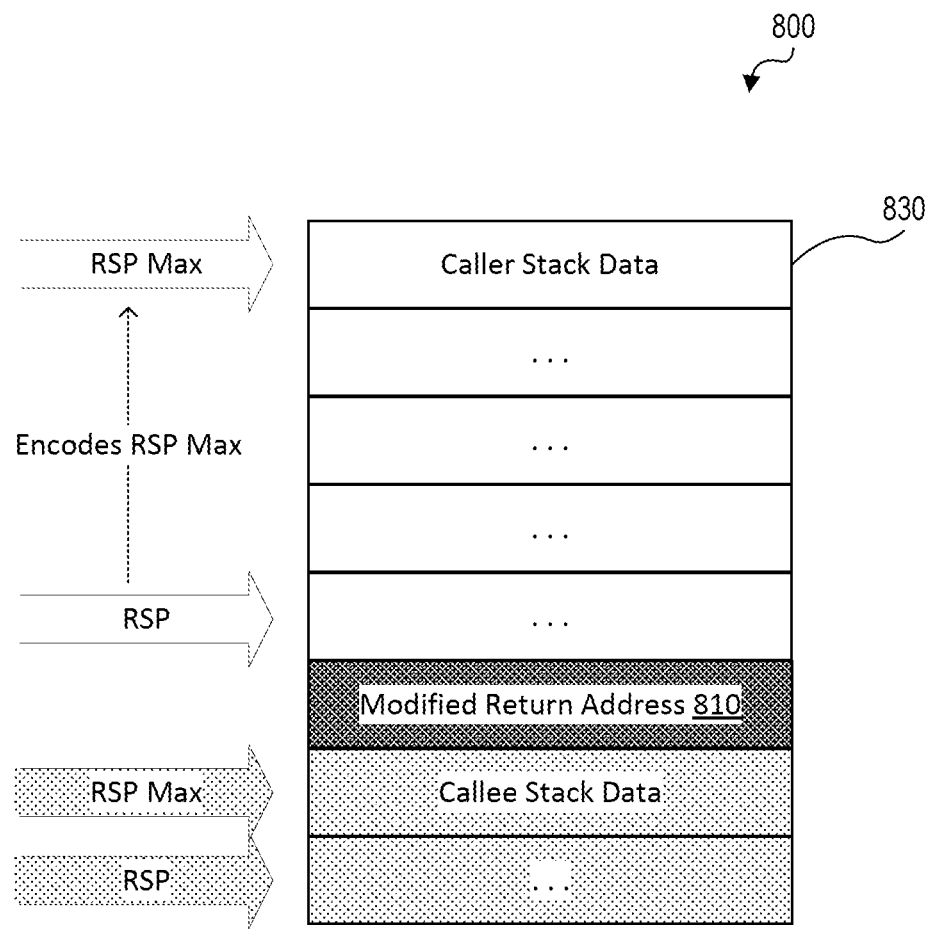

FIGS. 8A-8C illustrate an example of pointer-encoded metadata in accordance with embodiments of the present disclosure. In particular, FIGS. 8A-8B show example formats for a return address 810 and RIP register contents 820 that are 2GiB-aligned, while FIG. 8C shows an example stack 800 that uses encoded stack pointers and return addresses encoded with metadata (e.g., 810). In certain embodiments, certain bits (e.g., the upper 33 bits) in the return addresses may be used to store metadata (e.g., distance to top of caller frame (e.g., the distance from the return address 810 to the frame 830 of the stack 800), high-water mark (described above), and version info in 810), since only 31 bits are required to store a return address offset within a 2GiB code region. In some cases, the 33 upper bits of the return address could be obtained from the current program counter in the RIP register during function returns. For example, data in the 33 upper bits (software module upper address bits (SMUAB)) of the RIP register contents 820 may be replaced and used for the metadata region in the return address 810 that is stored on the stack. Additional operations may be needed when returning from one software module to a different one, since they may reside in different 2G-aligned regions. Example operations are described below with respect to FIG. 10.

Figure 9:
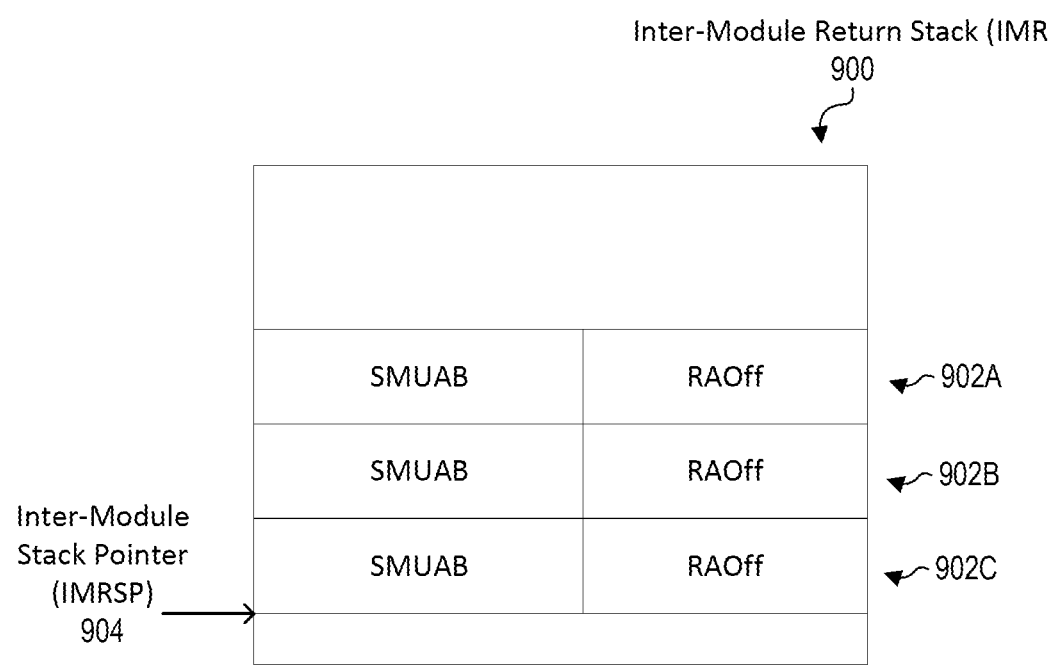
FIG. 9 illustrates an example Inter-Module Return Stack (IMRS) that utilizes a return address containing software module upper address bits (SMUAB) of a RIP register in accordance with embodiments of the present disclosure.

FIG. 9 illustrates an example Inter-Module Return Stack (IMRS) 900 that includes full return addresses 902 (e.g., the contents of 820 of FIG. 8B) that include the software module upper address bits (SMUAB) in accordance with embodiments of the present disclosure. Some embodiments may define a per-software-thread Inter-Module Return Stack (IMRS) such as 900 that simply contains these return addresses used for returning across module boundaries, e.g., as described below. The IMRS could be indexed by an IMRS Pointer (IMRSP) (e.g., 904) in thread-local storage. A dynamic loader could be extended to make use of the IMRS without requiring program changes, e.g., as described below. In many cases, the SMUAB for adjacent entries in the IMRS 900 will differ, since the code is in different software modules. It may be possible for two (or more) software modules to both fit within a 2GiB-aligned space, in which case the IMRSP 904 adds overhead without being needed for transfers between them.

Figure 10:
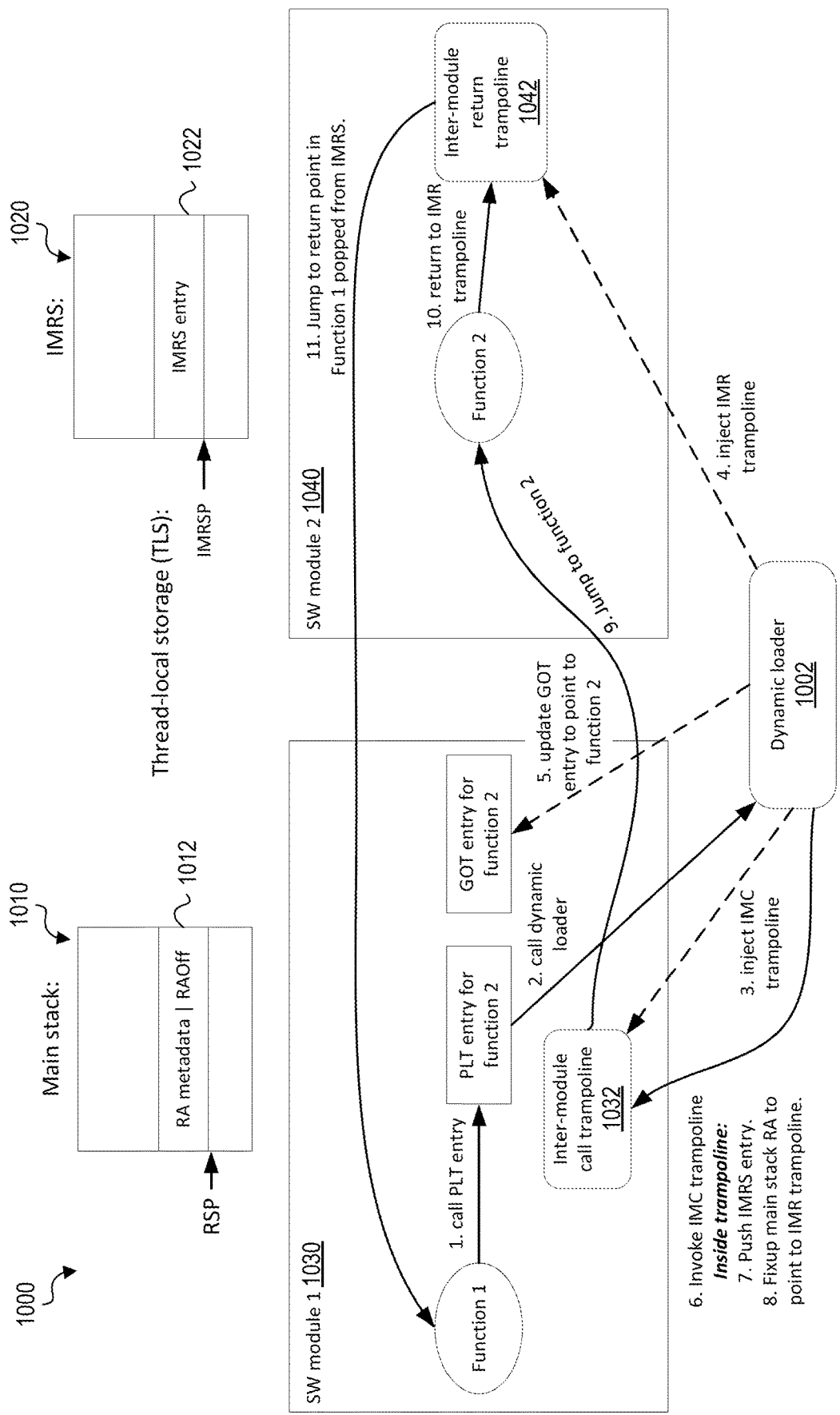
FIG. 10 illustrates an example process for using an IMRS in accordance with embodiments of the present disclosure.

FIG. 10 illustrates an example process for using an IMRS (e.g., 900) in accordance with embodiments of the present disclosure. In some embodiments, a dynamic loader (e.g., 1002) could rewrite the Procedure Linkage Table (PLT) in a first software module (e.g., 1030) to unconditionally jump to an "inter-module call" trampoline (e.g., 1032) injected by the dynamic loader into the same 2GiB-aligned region as the caller. That trampoline could push an IMRS entry (e.g., 1022) in an IMRS (e.g., 1020) prior to invoking the destination indicated in the Global Offset Table (GOT). The dynamic loader (e.g., 1002) could still update the GOT normally.

The inter-module call routine could also change the return address offset bits (e.g., the least-significant 31 bits) in the return address entry (e.g., 1012) on the main stack (e.g., 1010) to point to an "inter-module return" trampoline (e.g., 1042) injected by the dynamic loader (e.g., 1002) into the 2GiB-aligned region for the destination SW module (e.g., 1040). The return trampoline could operate by looking up the original return address from the inter-module stack and jumping to it. This will update the upper address bits in RIP, which will cause subsequent intra-module calls and returns to be processed properly. This may involve the use of a special instruction to selectively override the permissions enforced by CC that would ordinarily block write access to the return address. Untrusted libraries may need to be scanned to make sure they do not contain those instructions.

Some embodiments may inject a distinct inter-module call trampoline for each possible target routine so that the address of the target can be embedded in the code and the GOT could be updated by the dynamic loader to point to the appropriate trampoline. Write access to the trampoline code region would be restricted to the dynamic loader.

Some embodiments may unconditionally transfer control to a return address stored on the CET shadow stack to free up the entire 64 bits of storage designated for the return address on the main stack to instead be used to store metadata.

Some embodiments that do not require software modules to be aligned within power-of-two boundaries and sizes may either preserve sufficient return address bits to accommodate the maximum code address range within each software module or the return address offsets may be expressed as relative offsets from a software module base address that is stored in a register that is updated when switching between software modules to minimize the number of bits required to store the offset. The return instruction operation could be revised to add the return address offset to the software module base address to compute the return destination address.

In alternative embodiments, all of the instructions from all modules may be restricted to a smaller, contiguous subset of the total available address space such that upper return address bits can be used for metadata and replaced with all zeroes when computing the new instruction pointer value during a function return. The instructions may be restricted to the bottom of the address space or to some other region with a base address stored in a code base register. In the latter embodiment, the value of the code base register would be added to the stored return address value after zeroing the metadata bits to compute the new instruction pointer value.

The processor may also use faults or exceptions to decide what to do in the case of passing arguments on the stack. This would be used in conjunction with a flag, e.g. as a bit in a flags register that is modifiable by trusted software and hardware, that decides if adjacent frame accesses are allowed or not. The idea would be that an exception handler would handle a cross-frame violation event, and if determined it is allowed, set the flag to indicate to the processor that the adjacent frame access is allowed. The flag can be reset after the store operation completes or on a subsequent return. This would allow forward progress (albeit slow argument parsing). The flag can also just be enabled all the time allowing adjacent inter-frame accesses without triggering exceptions. In some cases, the exception handler may only be triggered on write violations to the caller's stack (as callees overwriting to stack arguments is expected to be rare). A special re-entrant exception handler may be written for these purposes, re-entrant in that on an exception the exception handler executes from the same privilege level as the executing program (e.g. user or supervisor), but does not use the same call stack (or possibly any call stack). If the re-entrant exception handler is itself interrupted, it will be executed again at the beginning by the processor as no intermediate state needs be saved. The processor simply re-executes the code at the start of the exception handler each time. The location of the first instruction of the exception handler can be defined in a processor register, e.g. an MSR, that may only allow privileged code to update the register assuring that only the authorized exception handler will execute on an exception.

A "heuristic" can be used (because there will be false positives) to determine via a heuristic the caller's intent "likely" was to pass arguments, then callee access to the caller's stack frame may be allowed only when the processor sees such a pattern in the caller's behavior consistent with the ABI. Sometimes that may be an accident in which case such a caller's frame becomes exposed to the callee. But if that is only the rare case, then there may be a way to limit this access, since all other cases with the pattern present consistent with the ABI will allow the callee access to the caller's frame. Processor can set a flag in the RSP or return vector to indicate when the processor observed such a caller pattern. For example, if the stack argument gets passed last after all the general purpose registers (GPRs) are accessed, the processor (or exception handler) noted that the sequence was the same, edi-esi-edx-ecx-r8d-r9d and then a stack access, and then a call, you could track that sequence and determine where the stack arguments likely are. Alternatively, the basic blocks during execution and the edi-esi-edx-ecx-r8d-r9d pattern may be tracked, along with stack accesses in a basic block in no particular order. A basic block may refer to a sequence of instructions ending with a branching instruction.

Another possible indicator that on-stack arguments may have been passed is when the register al has been initialized soon before issuing a call instruction, which is a part of passing variadic arguments.

Some embodiments may enhance the compiler to generate a pseudo-frame when preparing to call a function. On-stack arguments may be placed in the pseudo-frame. The pseudo-frame may be created by performing an additional call instruction prior to pushing arguments on the stack with the next instruction after the call being a jump instruction and the next instruction after that being the destination for the CALL. The instructions following the additional call instruction and preceding the call instruction that actually invokes the intended callee can access the local variables of the caller, which may be needed for initializing on-stack arguments. Upon returning from the callee and after popping arguments from the stack, the caller can perform an additional return instruction to exit the pseudo-frame. That will transfer control to the jump instruction following the additional call, which will in turn permit program execution to proceed. In these embodiments, access would be granted from a pointer encoded relative to a frame into the entire data region for the parent frame, i.e. excluding the return address and metadata. The extra frame division provided by the pseudo-frame would prevent unauthorized access to caller local variables from the callee. Example pseudocode illustrating these embodiments is listed below:

CALL 1f; enter the pseudo-frame
JMP 2f; continue execution after exiting the pseudo-frame
1:
  SUB $8, %RSP; may not be needed in some cases, or it could be combined with other stack frame adjustment instructions to preserve alignment
  PUSH <on-stack arg 2, e.g. 8 bytes in size>
  PUSH <on-stack arg 1, e.g. 8 bytes in size>
  PUSH <on-stack arg 0, e.g. 8 bytes in size>
  CALL f; call the intended function
  ADD $32, %RSP
  RET; exit pseudo-frame and return to JMP instruction after "CALL 1f"
2:
  ; continue executing code in caller . . .

An alternative embodiment would be to define new instructions to enter and exit a pseudo-frame. Those instructions would not branch, but they would perform the other operations for entering and existing encrypted stack frames as defined herein.

A further embodiment is to reserve a bit in the return address or other metadata storage to indicate whether any on-stack arguments have been passed. If not, no access would be allowed into the caller's frame using pointers relative to the stack frame marked in that way, and it would be unnecessary to create a pseudo-frame. A new or modified instruction may set the indicator bit. For example, a prefix to the CALL instruction could be defined for that purpose.

Example Architectures

Figure 11:
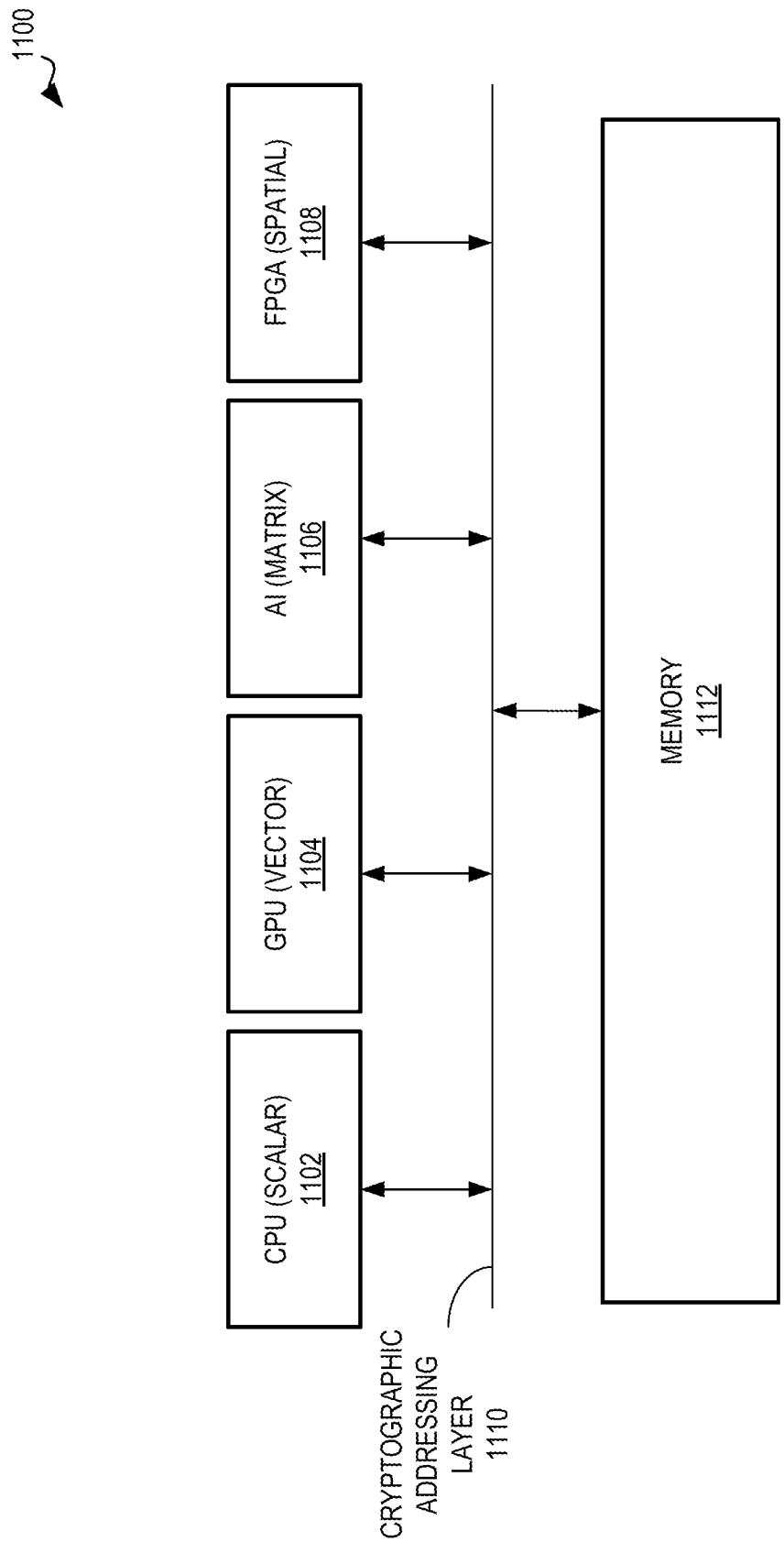
FIG. 11 is a block diagram illustrating an example cryptographic computing environment according to at least one embodiment.

FIG. 11 is a block diagram illustrating an example cryptographic computing environment 1100 according to at least one embodiment. In the example shown, a cryptographic addressing layer 1110 extends across the example compute vectors central processing unit (CPU) 1102, graphical processing unit (GPU) 1104, artificial intelligence (AI) 1106, and field programmable gate array (FPGA) 1108. For example, the CPU 1102 and GPU 1104 may share the same virtual address translation for data stored in memory 1112, and the cryptographic addresses may build on this shared virtual memory. They may share the same process key for a given execution flow, and compute the same tweaks to decrypt the cryptographically encoded addresses and decrypt the data referenced by such encoded addresses, following the same cryptographic algorithms.

Combined, the capabilities described herein may enable cryptographic computing. Memory 1112 may be encrypted at every level of the memory hierarchy, from the first level of cache through last level of cache and into the system memory. Binding the cryptographic address encoding to the data encryption may allow extremely fine-grain object boundaries and access control, enabling fine grain secure containers down to even individual functions and their objects for function-as-a-service. Cryptographically encoding return addresses on a call stack (depending on their location) may also enable control flow integrity without the need for shadow stack metadata. Thus, any of data access control policy and control flow can be performed cryptographically, simply dependent on cryptographic addressing and the respective cryptographic data bindings.

FIGS. 12-15 are block diagrams of exemplary computer architectures that may be used in accordance with embodiments disclosed herein. Generally, any computer architecture designs known in the art for processors and computing systems may be used. In an example, system designs and configurations known in the arts for laptops, desktops, handheld PCs, personal digital assistants, tablets, engineering workstations, servers, network devices, servers, appliances, network hubs, routers, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable for embodiments of computing systems described herein. Generally, suitable computer architectures for embodiments disclosed herein can include, but are not limited to, configurations illustrated in FIGS. 12-15.

Figure 12:
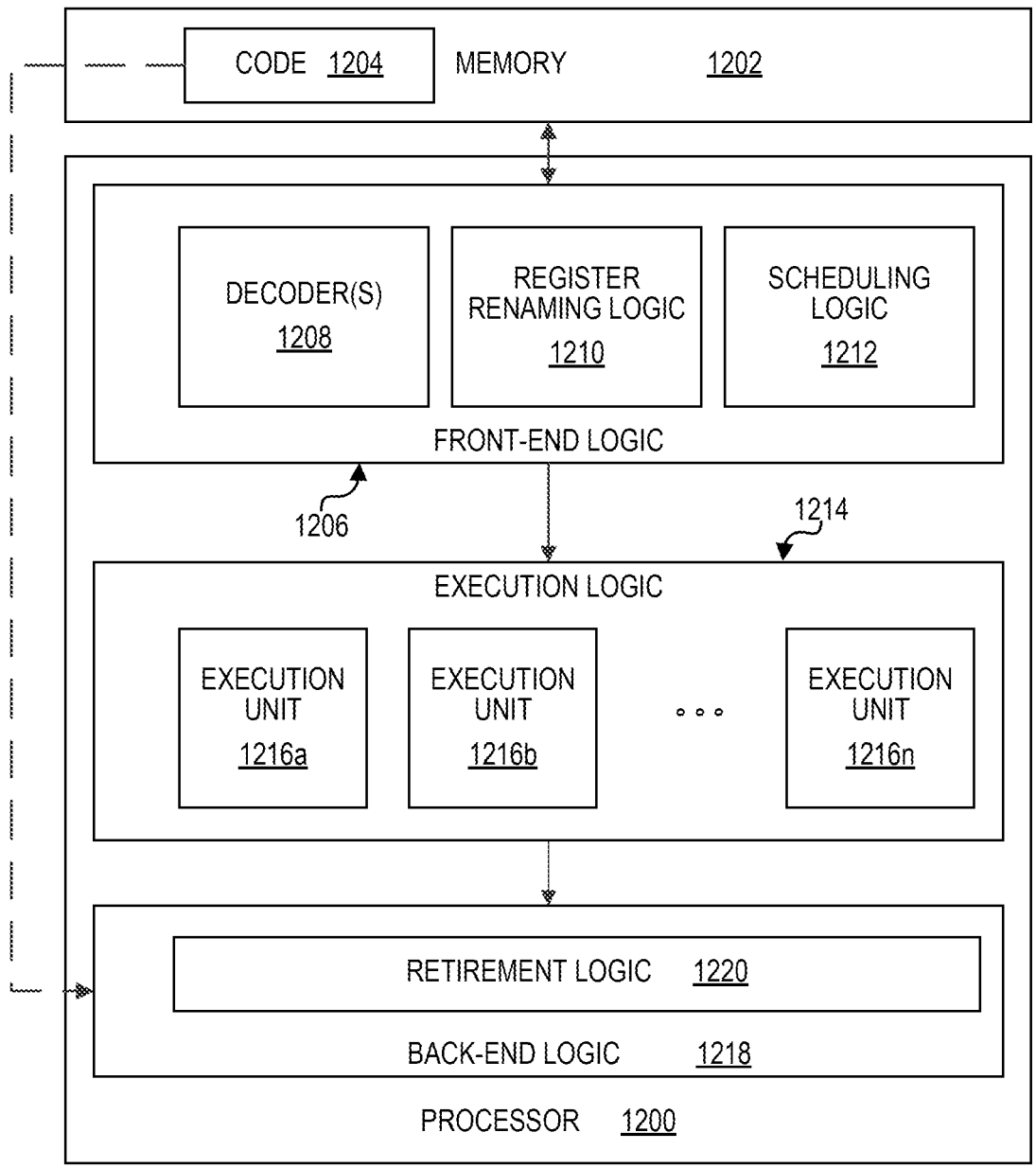
FIG. 12 is a block diagram illustrating an example processor core and memory according to at least one embodiment.
Figure 13:
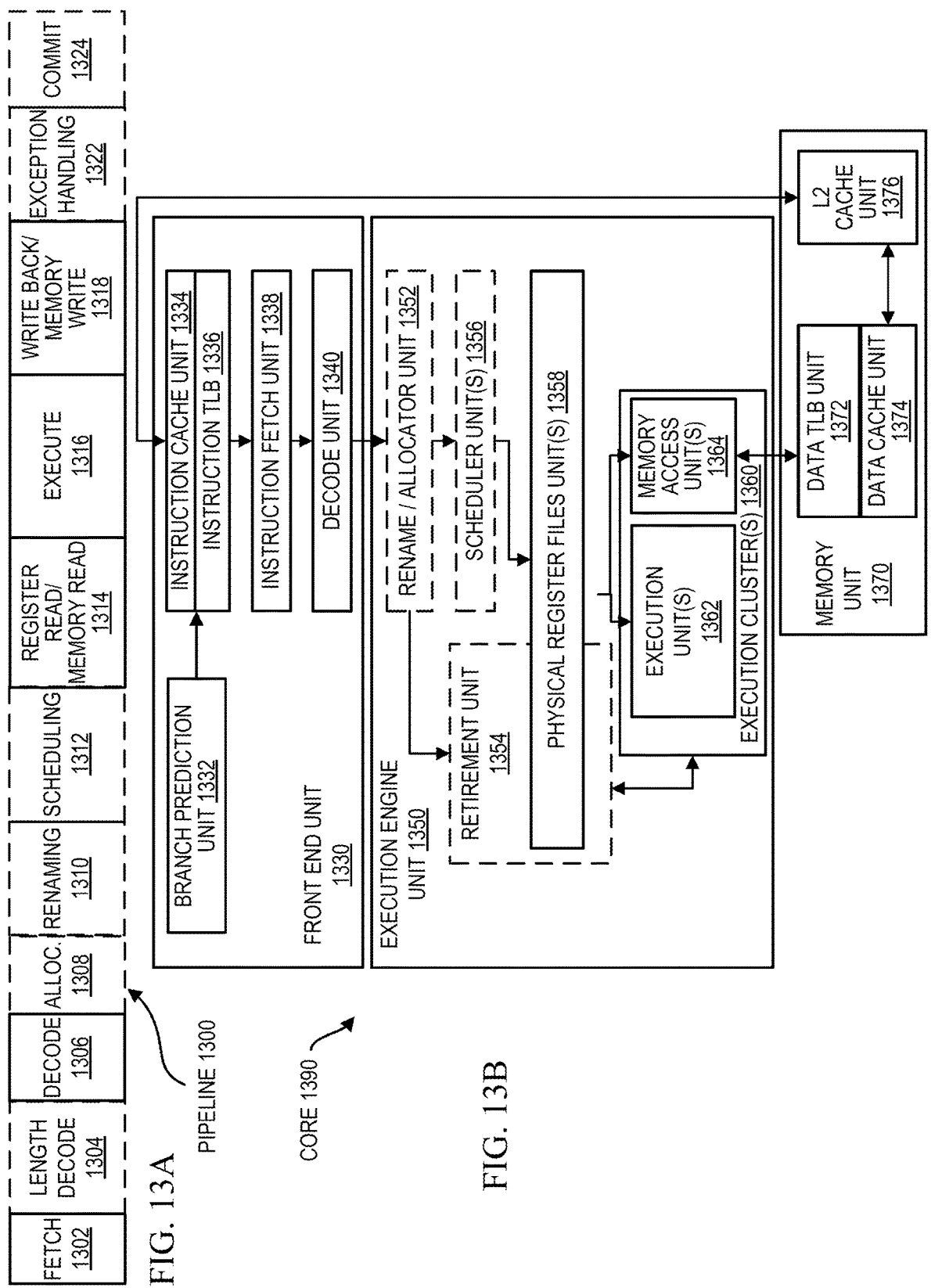
FIG. 13A is a block diagram illustrating both an exemplary in-order pipeline and an exemplary register renaming, out-of-order issue/execution pipeline in accordance with certain embodiments.
FIG. 13B is a block diagram illustrating both an exemplary embodiment of an in-order architecture core and an exemplary register renaming, out-of-order issue/execution architecture core to be included in a processor in accordance with certain embodiments.

FIG. 12 is an example illustration of a processor according to an embodiment. Processor 1200 is an example of a type of hardware device that can be used in connection with the implementations shown and described herein (e.g., processor 102). Processor 1200 may be any type of processor, such as a microprocessor, an embedded processor, a digital signal processor (DSP), a network processor, a multi-core processor, a single core processor, or other device to execute code. Although only one processor 1200 is illustrated in FIG. 12, a processing element may alternatively include more than one of processor 1200 illustrated in FIG. 12. Processor 1200 may be a single-threaded core or, for at least one embodiment, the processor 1200 may be multi-threaded in that it may include more than one hardware thread context (or "logical processor") per core.

FIG. 12 also illustrates a memory 1202 coupled to processor 1200 in accordance with an embodiment. Memory 1202 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1200 can execute any type of instructions associated with algorithms, processes, or operations detailed herein. Generally, processor 1200 can transform an element or an article (e.g., data) from one state or thing to another state or thing.

Code 1204, which may be one or more instructions to be executed by processor 1200, may be stored in memory 1202, or may be stored in software, hardware, firmware, or any suitable combination thereof, or in any other internal or external component, device, element, or object where appropriate and based on particular needs. In one example, processor 1200 can follow a program sequence of instructions indicated by code 1204. Each instruction enters a front-end logic 1206 and is processed by one or more decoders 1208. The decoder may generate, as its output, a micro operation such as a fixed width micro operation in a predefined format, or may generate other instructions, microinstructions, or control signals that reflect the original code instruction. Front-end logic 1206 also includes register renaming logic 1210 and scheduling logic 1212, which generally allocate resources and queue the operation corresponding to the instruction for execution.

Processor 1200 can also include execution logic 1214 having a set of execution units 1216a, 1216b, 1216n, etc. Some embodiments may include a number of execution units dedicated to specific functions or sets of functions. Other embodiments may include only one execution unit or one execution unit that can perform a particular function. Execution logic 1214 performs the operations specified by code instructions.

After completion of execution of the operations specified by the code instructions, back-end logic 1218 can retire the instructions of code 1204. In one embodiment, processor 1200 allows out of order execution but requires in order retirement of instructions. Retirement logic 1220 may take a variety of known forms (e.g., re-order buffers or the like). In this manner, processor 1200 is transformed during execution of code 1204, at least in terms of the output generated by the decoder, hardware registers and tables utilized by register renaming logic 1210, and any registers (not shown) modified by execution logic 1214.

Although not shown in FIG. 12, a processing element may include other elements on a chip with processor 1200. For example, a processing element may include memory control logic along with processor 1200. The processing element may include I/O control logic and/or may include I/O control logic integrated with memory control logic. The processing element may also include one or more caches. In some embodiments, non-volatile memory (such as flash memory or fuses) may also be included on the chip with processor 1200.

FIG. 13A is a block diagram illustrating both an exemplary in-order pipeline and an exemplary register renaming, out-of-order issue/execution pipeline according to one or more embodiments of this disclosure. FIG. 13B is a block diagram illustrating both an exemplary embodiment of an in-order architecture core and an exemplary register renaming, out-of-order issue/execution architecture core to be included in a processor according to one or more embodiments of this disclosure. The solid lined boxes in FIGS. 13A-13B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 13A, a processor pipeline 1300 includes a fetch stage 1302, a length decode stage 1304, a decode stage 1306, an allocation stage 1308, a renaming stage 1310, a schedule (also known as a dispatch or issue) stage 1312, a register read/memory read stage 1314, an execute stage 1316, a write back/memory write stage 1318, an exception handling stage 1322, and a commit stage 1324.

FIG. 13B shows processor core 1390 including a front end unit 1330 coupled to an execution engine unit 1350, and both are coupled to a memory unit 1370. Processor core 1390 and memory unit 1370 are examples of the types of hardware that can be used in connection with the implementations shown and described herein (e.g., processor 102, memory 122). The core 1390 may be a reduced instruction set computing (RISC) core, a complex instruction set computing (CISC) core, a very long instruction word (VLIW) core, or a hybrid or alternative core type. As yet another option, the core 1390 may be a special-purpose core, such as, for example, a network or communication core, compression engine, coprocessor core, general purpose computing graphics processing unit (GPGPU) core, graphics core, or the like. In addition, processor core 1390 and its components represent example architecture that could be used to implement logical processors and their respective components.

The front end unit 1330 includes a branch prediction unit 1332 coupled to an instruction cache unit 1334, which is coupled to an instruction translation lookaside buffer (TLB) unit 1336, which is coupled to an instruction fetch unit 1338, which is coupled to a decode unit 1340. The decode unit 1340 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1390 includes a microcode ROM or other medium that stores microcode for certain macroinstructions (e.g., in decode unit 1340 or otherwise within the front end unit 1330). The decode unit 1340 is coupled to a rename/allocator unit 1352 in the execution engine unit 1350.

The execution engine unit 1350 includes the rename/allocator unit 1352 coupled to a retirement unit 1354 and a set of one or more scheduler unit(s) 1356. The scheduler unit(s) 1356 represents any number of different schedulers, including reservations stations, central instruction window, etc. The scheduler unit(s) 1356 is coupled to the physical register file(s) unit(s) 1358. Each of the physical register file(s) units 1358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1358 comprises a vector registers unit, a write mask registers unit, and a scalar registers unit. These register units may provide architectural vector registers, vector mask registers, and general purpose registers (GPRs). In at least some embodiments described herein, register units 1358 are examples of the types of hardware that can be used in connection with the implementations shown and described herein (e.g., registers 112). The physical register file(s) unit(s) 1358 is overlapped by the retirement unit 1354 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 1354 and the physical register file(s) unit(s) 1358 are coupled to the execution cluster(s) 1360. The execution cluster(s) 1360 includes a set of one or more execution units 1362 and a set of one or more memory access units 1364. The execution units 1362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Execution units 1362 may also include an address generation unit to calculate addresses used by the core to access main memory (e.g., memory unit 1370) and a page miss handler (PMH).

The scheduler unit(s) 1356, physical register file(s) unit(s) 1358, and execution cluster(s) 1360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1364). It should also be understood that where separate pipelines are used, one or more of these pipelines may be out-of-order issue/execution and the rest in-order.

The set of memory access units 1364 is coupled to the memory unit 1370, which includes a data TLB unit 1372 coupled to a data cache unit 1374 coupled to a level 2 (L2) cache unit 1376. In one exemplary embodiment, the memory access units 1364 may include a load unit, a store address unit, and a store data unit, each of which is coupled to the data TLB unit 1372 in the memory unit 1370. The instruction cache unit 1334 is further coupled to a level 2 (L2) cache unit 1376 in the memory unit 1370. The L2 cache unit 1376 is coupled to one or more other levels of cache and eventually to a main memory. In addition, a page miss handler (e.g., page miss handler 826) may also be included in core 1390 to look up an address mapping in a page table if no match is found in the data TLB unit 1372.

By way of example, the exemplary register renaming, out-of-order issue/execution core architecture may implement the pipeline 1300 as follows: 1) the instruction fetch unit 1338 performs the fetch and length decoding stages 1302 and 1304; 2) the decode unit 1340 performs the decode stage 1306; 3) the rename/allocator unit 1352 performs the allocation stage 1308 and renaming stage 1310; 4) the scheduler unit(s) 1356 performs the schedule stage 1312; 5) the physical register file(s) unit(s) 1358 and the memory unit 1370 perform the register read/memory read stage 1314; the execution cluster 1360 perform the execute stage 1316; 6) the memory unit 1370 and the physical register file(s) unit(s) 1358 perform the write back/memory write stage 1318; 7) various units may be involved in the exception handling stage 1322; and 8) the retirement unit 1354 and the physical register file(s) unit(s) 1358 perform the commit stage 1324.

The core 1390 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology). Accordingly, in at least some embodiments, multi-threaded enclaves may be supported.

While register renaming is described in the context of out-of-order execution, it should be understood that register renaming may be used in an in-order architecture. While the illustrated embodiment of the processor also includes separate instruction and data cache units 1334/1374 and a shared L2 cache unit 1376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 14:
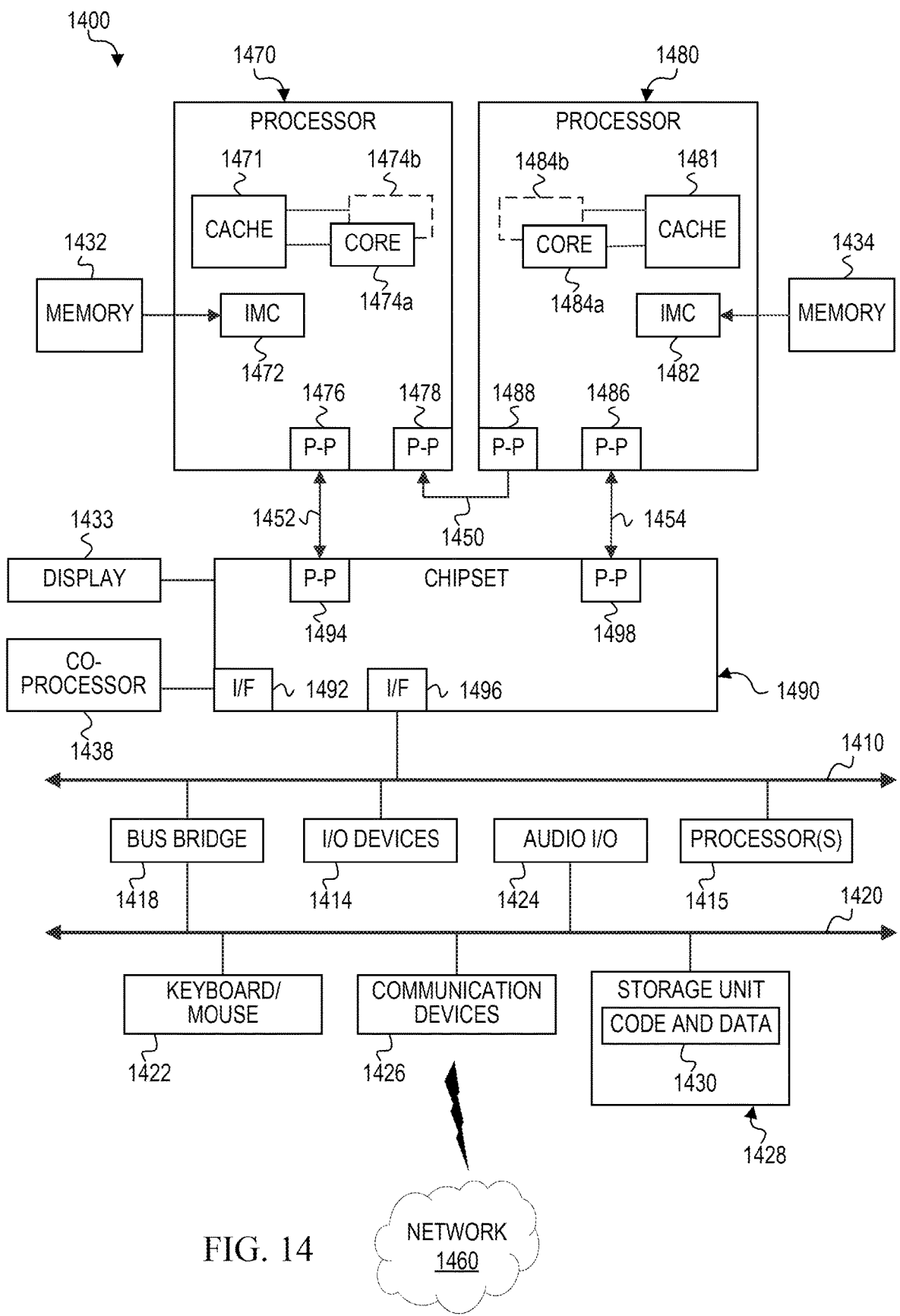
FIG. 14 is a block diagram of an example computer architecture according to at least one embodiment.

FIG. 14 illustrates a computing system 1400 that is arranged in a point-to-point (PtP) configuration according to an embodiment. In particular, FIG. 14 shows a system where processors, memory, and input/output devices are interconnected by a number of point-to-point interfaces. Generally, one or more of the computing systems or computing devices described (e.g., computing device 100) herein may be configured in the same or similar manner as computing system 1400.

Processors 1470 and 1480 may be implemented as single core processors 1474a and 1484a or multi-core processors 1474a-1474b and 1484a-1484b. Processors 1470 and 1480 may each include a cache 1471 and 1481 used by their respective core or cores. A shared cache (not shown) may be included in either processors or outside of both processors, yet connected with the processors via P-P interconnect, such that either or both processors' local cache information may be stored in the shared cache if a processor is placed into a low power mode. It should be noted that one or more embodiments described herein could be implemented in a computing system, such as computing system 1400. Moreover, processors 1470 and 1480 are examples of the types of hardware that can be used in connection with the implementations shown and described herein (e.g., processor 102).

Processors 1470 and 1480 may also each include integrated memory controller logic (MC) 1472 and 1482 to communicate with memory elements 1432 and 1434, which may be portions of main memory locally attached to the respective processors. In alternative embodiments, memory controller logic 1472 and 1482 may be discrete logic separate from processors 1470 and 1480. Memory elements 1432 and/or 1434 may store various data to be used by processors 1470 and 1480 in achieving operations and functionality outlined herein.

Processors 1470 and 1480 may be any type of processor, such as those discussed in connection with other figures. Processors 1470 and 1480 may exchange data via a point-to-point (PtP) interface 1450 using point-to-point interface circuits 1478 and 1488, respectively. Processors 1470 and 1480 may each exchange data with an input/output (I/O) subsystem 1490 via individual point-to-point interfaces 1452 and 1454 using point-to-point interface circuits 1476, 1486, 1494, and 1498. I/O subsystem 1490 may also exchange data with a high-performance graphics circuit 1438 via a high-performance graphics interface 1439, using an interface circuit 1492, which could be a PtP interface circuit. In one embodiment, the high-performance graphics circuit 1438 is a special-purpose processor, such as, for example, a high-throughput MIC processor, a network or communication processor, compression engine, graphics processor, GPGPU, embedded processor, or the like. I/O subsystem 1490 may also communicate with a display 1433 for displaying data that is viewable by a human user. In alternative embodiments, any or all of the PtP links illustrated in FIG. 14 could be implemented as a multi-drop bus rather than a PtP link.

I/O subsystem 1490 may be in communication with a bus 1420 via an interface circuit 1496. Bus 1420 may have one or more devices that communicate over it, such as a bus bridge 1418 and I/O devices 1416. Via a bus 1410, bus bridge 1418 may be in communication with other devices such as a user interface 1412 (such as a keyboard, mouse, touchscreen, or other input devices), communication devices 1426 (such as modems, network interface devices, or other types of communication devices that may communicate through a computer network 1460), audio I/O devices 1414, and/or a data storage device 1428. Data storage device 1428 may store code 1430 and/or other data, which may be executed by processors 1470 and/or 1480. In alternative embodiments, any portions of the bus architectures could be implemented with one or more PtP links.

Program code, such as code 1430, may be applied to input instructions to perform the functions described herein and generate output information. The output information may be applied to one or more output devices, in known fashion. For purposes of this application, a processing system may be part of computing system 1400 and includes any system that has a processor, such as, for example; a digital signal processor (DSP), a microcontroller, an application specific integrated circuit (ASIC), or a microprocessor.

The program code (e.g., 1430) may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the one or more of the techniques described herein. Such representations, known as "IP cores" may be stored on a tangible, machine-readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the present disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

The computing system depicted in FIG. 14 is a schematic illustration of an embodiment of a computing system that may be utilized to implement various embodiments discussed herein. It will be appreciated that various components of the system depicted in FIG. 14 may be combined in a system-on-a-chip (SoC) architecture or in any other suitable configuration capable of achieving the functionality and features of examples and implementations provided herein.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 15:
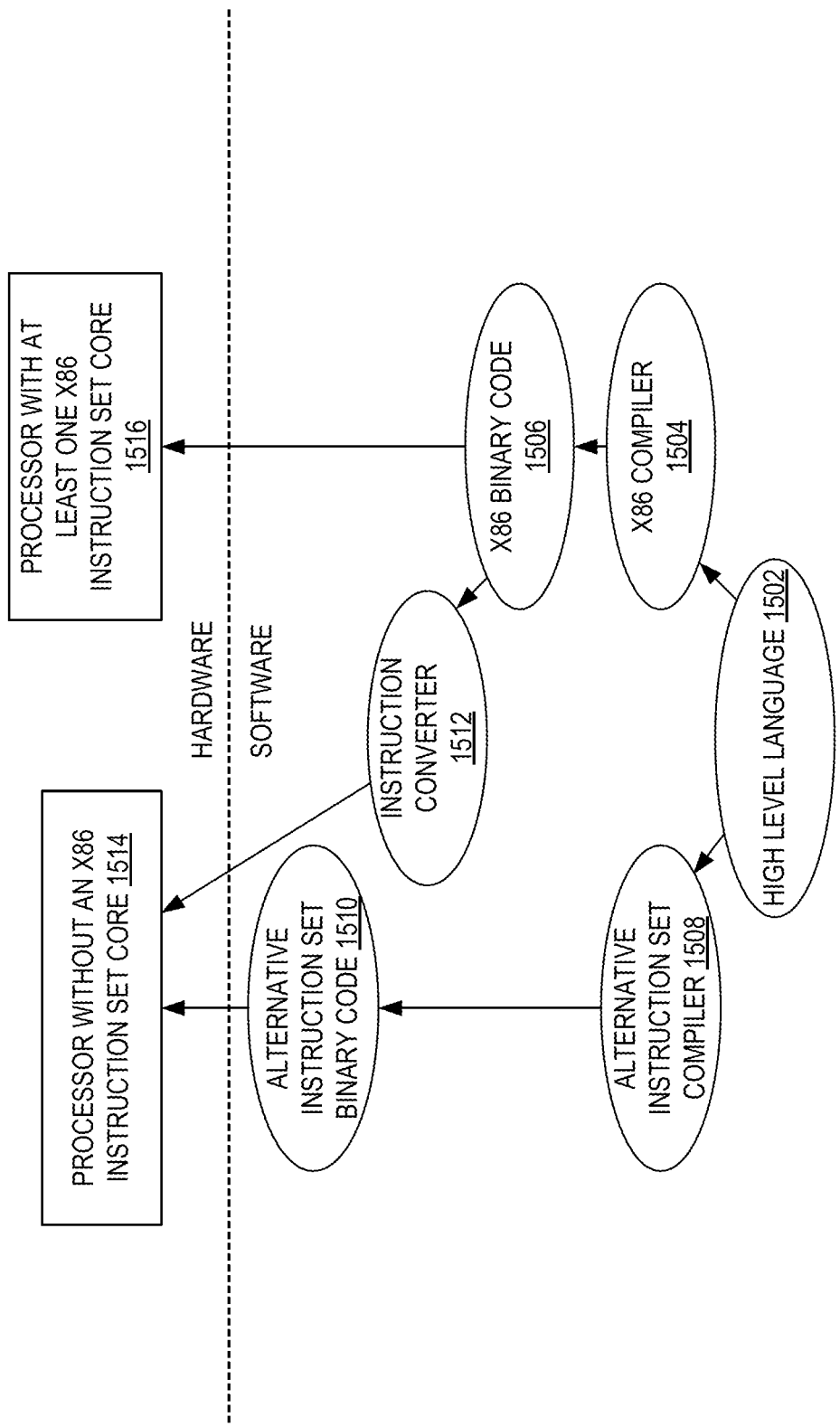
FIG. 15 is a block diagram contrasting the use of a software instruction converter to convert binary instructions in a source instruction set to binary instructions in a target instruction set according to embodiments of the present disclosure.

FIG. 15 is a block diagram contrasting the use of a software instruction converter to convert binary instructions in a source instruction set to binary instructions in a target instruction set according to embodiments of this disclosure. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

The architectures presented herein are provided by way of example only, and are intended to be non-exclusive and non-limiting. Furthermore, the various parts disclosed are intended to be logical divisions only, and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

Note that with the examples provided herein, interaction may be described in terms of a single computing system. However, this has been done for purposes of clarity and example only. In certain cases, it may be easier to describe one or more of the functionalities of a given set of flows by only referencing a single computing system. Moreover, the system for deep learning and malware detection is readily scalable and can be implemented across a large number of components (e.g., multiple computing systems), as well as more complicated/sophisticated arrangements and configurations. Accordingly, the examples provided should not limit the scope or inhibit the broad teachings of the computing system as potentially applied to a myriad of other architectures.

As used herein, unless expressly stated to the contrary, use of the phrase 'at least one of' refers to any combination of the named items, elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

References in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

While this specification contains many specific implementation details, these should not be construed as limitations on the scope of any embodiments or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, the separation of various system components and modules in the embodiments described above should not be understood as requiring such separation in all embodiments. It should be understood that the described program components, modules, and systems can generally be integrated together in a single software product or packaged into multiple software products.

Thus, particular embodiments of the subject matter have been described. Other embodiments are within the scope of this disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Other Notes and Examples

The following examples pertain to embodiments in accordance with this specification. The system, apparatus, method, and machine-readable storage medium embodiments can include one or a combination of the following examples:

Example M1 includes a method comprising: accessing an encoded pointer in a stack pointer register, the encoded pointer comprising ciphertext and an offset value; constructing a decoded pointer based on decrypting the ciphertext, wherein the decoded pointer includes a fixed value and the offset value of the encoded pointer; accessing encrypted stack data in a stack frame based on the decoded pointer; and decrypting the encrypted stack based on the encoded pointer.

Example M2 includes the subject matter of Example M1, wherein decrypting the encrypted stack data comprises using at least a portion of the encoded pointer as an initialization value.

Example M3 includes the subject matter of Example M2, wherein the initialization value comprises a subset of the encoded pointer including the ciphertext.

Example M4 includes the subject matter of any one of Examples M1-M3, wherein decrypting the encrypted stack data is based on a block cipher.

Example M5 includes the subject matter of Example M4, wherein the block cipher is an AES-based block cipher.

Example M6 includes the subject matter of any one of Examples M1-M5, wherein plaintext obtained from decryption of the ciphertext comprises a maximum offset value indicating a highest address of the stack frame, and the method further comprises comparing the maximum offset value to the offset value.

Example M7 includes the subject matter of any one of Examples M1-M6, further comprising validating the decryption of the ciphertext based on information in plaintext obtained from the decryption.

Example M8 includes the subject matter of Example M7, wherein validating the decryption comprises determining whether a mutation has occurred based on a portion of the plaintext.

Example M9 includes the subject matter of Example M7 or M8, wherein validating the decryption comprises performing an entropy test.

Example M10 includes the subject matter of any one of Examples M7-M9, wherein the information of the plaintext used to validate the decryption comprises a fixed or computed validation code (VC).

Example M11 includes the subject matter of any one of Examples M7-M9, wherein the information of the plaintext used to validate the decryption comprises a pointer authentication code (PAC).

Example M12 includes the subject matter of Example M11, wherein the PAC comprises a message authentication code (MAC).

Example M13 includes the subject matter of Example M11 or M12, wherein the PAC is based on an address portion of an unencoded version of the encoded pointer.

Example M14 includes the subject matter of any one of Examples M11-M13, wherein the PAC comprises context information.

Example M15 includes the subject matter of any one of Examples M1-M14, wherein constructing the decoded pointer comprises restoring the fixed value from a shared register.

Example M16 includes the subject matter of any one of Examples M1-M15, wherein the encoded pointer comprises a value indicating that the encoded pointer is an encoded stack pointer.

Example M17 includes the subject matter of any one of Examples M1-M16, wherein decrypting the ciphertext is based on a block cipher.

Example M18 includes the subject matter of Example M17, wherein the block cipher is an AES-based block cipher.

Example M19 includes a method comprising: obtaining a stack pointer for an address in a stack frame, the stack pointer comprising an offset value; constructing a decorated pointer comprising the offset value and a maximum offset value indicating a highest address of the stack frame; constructing an encoded pointer comprising the offset value and ciphertext based on encrypting a portion of the decorated pointer that includes the maximum offset value; encrypting stack data based on the encoded pointer; storing the encrypted stack data in the stack frame; and storing the encoded pointer in a stack pointer register of a processor.

Example M20 includes the subject matter of Example M19, wherein encrypting the stack data is based on a block cipher.

Example M21 includes the subject matter of Example M20, wherein the block cipher is an AES-based block cipher.

Example M22 includes the subject matter of any one of Examples M19-M21, wherein the decorated pointer comprises a fixed or computed validation code (VC).

Example M23 includes the subject matter of any one of Examples M19-M22, wherein the decorated pointer comprises a pointer authentication code (PAC).

Example M24 includes the subject matter of Example M23, wherein the PAC comprises a message authentication code (MAC).

Example M25 includes the subject matter of Example M23, wherein the PAC is based on an address portion of the stack pointer.

Example M26 includes the subject matter of Example M24 or M25, wherein PAC comprises context information.

Example M27 includes the subject matter of any one of Examples M19-M26, wherein the decorated pointer comprises version information.

Example M28 includes the subject matter of Examples M22-M27, wherein the ciphertext is further based on encrypting a portion of the decorated pointer including the maximum offset value and one or more of the validation code, the PAC, and the version information.

Example M29 includes the subject matter of Examples M19-M28, wherein the encoded pointer comprises a value indicating that the encoded pointer is an encoded stack pointer.

Example M30 includes the subject matter of Examples M19-M29, wherein the ciphertext is encrypted based on a block cipher.

Example M31 includes the subject matter of Example M30, wherein the block cipher is an AES-based block cipher.

Example M32 includes the subject matter of any one of Examples M19-M31, wherein the stack pointer is a final stack pointer for a caller function's frame, and the method further comprises storing a copy of the encoded pointer in call information for a callee function called by the caller function.

Example M33 includes the subject matter of Example M32, further comprising storing additional metadata in the call information for the callee function.

Example M34 includes the subject matter of Example M33, wherein the metadata comprises a high-water mark indicating a highest location in the caller function's frame at which the callee function accessed.

Example M35 includes the subject matter of Example M32, further comprising reserving space in the call information for the callee function for storage of a final stack pointer for the callee function's frame.

Example M36 includes the subject matter of any one of Examples M19-M31, wherein the stack pointer is a final stack pointer for a caller function's frame, and the method further comprises storing a modified return address in call information for a callee function called by the caller function, the modified return address comprising a portion of a return address offset and metadata.

Example M37 includes the subject matter of Example M36, wherein the metadata comprises one or more of a distance to the top of the caller function's frame, version information, and a high-water mark indicating a highest location in the caller function's frame at which the callee function accessed.

Example M38 includes the subject matter of Example M36, further comprising storing an unmodified version of the return address in an inter-module return stack.

Example M39 includes the subject matter of Example M38, wherein the inter-module return stack is stored in thread-local storage.

Example M40 includes the subject matter of Example M38 or M39, further comprising: accessing the modified return address going between functions of the same software module; and accessing the unmodified version of the return address in the inter-module return stack going between functions of different software modules.

Example X1 provides an apparatus comprising means for performing the method of any one of Examples M1-M40.

In Example X2, the subject matter of Example X1 can optionally include where the means for performing the method comprise at least one processor and at least one memory element.

In Example X3, the subject matter of Example X2 can optionally include where the at least one memory element comprises machine-readable instructions that when executed, cause the apparatus to perform the method of any one of Examples M1-M40.

In Example X4, the subject matter of any one of Examples X1-X3 can optionally include where the apparatus is one of a processor, computing system, or a system-on-a-chip.

Example Y1 provides at least one machine-readable storage medium comprising instructions, where the instructions when executed by one or more processors implement a method as provided in any one of Examples M1-M10.

Example P1 includes a processor comprising: a stack pointer register to store encoded stack pointers comprising ciphertext and offset values; and execution circuitry to: access an encoded stack pointer in the stack pointer register; construct a decoded stack pointer based on decrypting the ciphertext, wherein the decoded stack pointer includes a fixed value and the offset value of the encoded stack pointer; access encrypted stack data in a stack frame based on the decoded stack pointer; and decrypt the encrypted stack based on the encoded stack pointer.

Example P2 includes the subject matter of Example P1, wherein decrypting the encrypted stack data comprises using at least a portion of the encoded pointer as an initialization value.

Example P3 includes the subject matter of Example P2, wherein the initialization value comprises a subset of the encoded pointer including the ciphertext.

Example P4 includes the subject matter of any one of Examples P1-P3, wherein decrypting the encrypted stack data is based on a block cipher.

Example P5 includes the subject matter of Example P4, wherein the block cipher is an AES-based block cipher.

Example P6 includes the subject matter of any one of Examples P1-P5, wherein plaintext obtained from decryption of the ciphertext comprises a maximum offset value indicating a highest address of the stack frame, and the execution circuitry is further to compare the maximum offset value to the offset value.

Example P7 includes the subject matter of any one of Examples P1-P6, wherein the execution circuitry is further to validate the decryption of the ciphertext based on information in plaintext obtained from the decryption.

Example P8 includes the subject matter of Example P7, wherein validating the decryption comprises determining whether a mutation has occurred based on a portion of the plaintext.

Example P9 includes the subject matter of Example P7 or P8, wherein validating the decryption comprises performing an entropy test.

Example P10 includes the subject matter of any one of Examples P7-P9, wherein the information of the plaintext used to validate the decryption comprises a fixed or computed validation code (VC).

Example P11 includes the subject matter of any one of Examples P7-P9, wherein the information of the plaintext used to validate the decryption comprises a pointer authentication code (PAC).

Example P12 includes the subject matter of Example P11, wherein the PAC comprises a message authentication code (MAC).

Example P13 includes the subject matter of Example P11 or P12, wherein the PAC is based on an address portion of an unencoded version of the encoded pointer.

Example P14 includes the subject matter of any one of Examples P11-P13, wherein the PAC comprises context information.

Example P15 includes the subject matter of any one of Examples P1-P14, wherein constructing the decoded pointer comprises restoring the fixed value from a shared register.

Example P16 includes the subject matter of any one of Examples P1-P15, wherein the encoded pointer comprises a value indicating that the encoded pointer is an encoded stack pointer.

Example P17 includes the subject matter of any one of Examples P1-P16, wherein decrypting the ciphertext is based on a block cipher.

Example P18 includes the subject matter of Example P17, wherein the block cipher is an AES-based block cipher.

Example P19 includes a processor comprising: a stack pointer register; and execution circuitry to: obtain a stack pointer for an address in a stack frame, the stack pointer comprising an offset value; construct a decorated pointer comprising the offset value and a maximum offset value indicating a highest address of the stack frame; generate ciphertext by encrypting a portion of the decorated pointer that includes the maximum offset value; construct an encoded pointer comprising the offset value and the ciphertext; encrypt stack data based on the encoded pointer; store the encrypted stack data in the stack frame; and store the encoded pointer in the stack pointer register.

Example P20 includes the subject matter of Example P19, wherein encrypting the stack data is based on a block cipher.

Example P21 includes the subject matter of Example P20, wherein the block cipher is an AES-based block cipher.

Example P22 includes the subject matter of any one of Examples P19-P21, wherein the decorated pointer comprises a fixed or computed validation code (VC).

Example P23 includes the subject matter of any one of Examples P19-P22, wherein the decorated pointer comprises a pointer authentication code (PAC).

Example P24 includes the subject matter of Example P23, wherein the PAC comprises a message authentication code (MAC).

Example P25 includes the subject matter of Example P23, wherein the PAC is based on an address portion of the stack pointer.

Example P26 includes the subject matter of Example P24 or P25, wherein PAC comprises context information.

Example P27 includes the subject matter of any one of Examples P19-P26, wherein the decorated pointer comprises version information.

Example P28 includes the subject matter of Examples P22-P27, wherein the ciphertext is further based on encrypting a portion of the decorated pointer including the maximum offset value and one or more of the validation code, the PAC, and the version information.

Example P29 includes the subject matter of Examples P19-P28, wherein the encoded pointer comprises a value indicating that the encoded pointer is an encoded stack pointer.

Example P30 includes the subject matter of Examples P19-P29, wherein the ciphertext is encrypted based on a block cipher.

Example P31 includes the subject matter of Example P30, wherein the block cipher is an AES-based block cipher.

Example P32 includes the subject matter of any one of Examples P19-P31, wherein the stack pointer is a final stack pointer for a caller function's frame, and the execution circuitry is further to store a copy of the encoded pointer in call information for a callee function called by the caller function.

Example P33 includes the subject matter of Example P32, wherein the execution circuitry is further to store additional metadata in the call information for the callee function.

Example P34 includes the subject matter of Example P33, wherein the metadata comprises a high-water mark indicating a highest location in the caller function's frame at which the callee function accessed.

Example P35 includes the subject matter of Example P32, wherein the execution circuitry is further to reserve space in the call information for the callee function for storage of a final stack pointer for the callee function's frame.

Example P36 includes the subject matter of any one of Examples P19-P31, wherein the stack pointer is a final stack pointer for a caller function's frame, and the execution circuitry is further to store a modified return address in call information for a callee function called by the caller function, the modified return address comprising a portion of a return address offset and metadata.

Example P37 includes the subject matter of Example P36, wherein the metadata comprises one or more of a distance to the top of the caller function's frame, version information, and a high-water mark indicating a highest location in the caller function's frame at which the callee function accessed.

Example P38 includes the subject matter of Example P36, wherein the execution circuitry is further to store an unmodified version of the return address in an inter-module return stack.

Example P39 includes the subject matter of Example P38, wherein the inter-module return stack is stored in thread-local storage.

Example P40 includes the subject matter of Example P38 or P39, wherein the execution circuitry is further to: access the modified return address going between functions of the same software module; and access the unmodified version of the return address in the inter-module return stack going between functions of different software modules.

Example S1 includes a system comprising memory and a processor as provided in any one of Examples P1-P40, wherein the stack data is stored in the memory.

Example S2 includes the subject matter of Example S1, wherein the system comprises a system-on-chip.

The invention claimed is:

1. A processor comprising:
a stack pointer register; and
execution circuitry to:
obtain a stack pointer for an address in a stack frame, the stack pointer comprising an offset value;
construct a decorated pointer comprising the offset value, a maximum offset value indicating a highest address of the stack frame, and additional information comprising at least one of version information and a fixed or computed code value;
generate ciphertext by encrypting a portion of the decorated pointer that includes the maximum offset value and the additional information;
construct an encoded pointer comprising the offset value and the ciphertext;
encrypt stack data based on the encoded pointer;
store the encrypted stack data in the stack frame; and
store the encoded pointer in the stack pointer register.

2. The processor of claim 1, wherein the encoded pointer comprises a value indicating that the encoded pointer is an encoded stack pointer.

3. The processor of claim 1, wherein the stack pointer is a final stack pointer for a caller function's frame, and the execution circuitry is further to store a copy of the encoded pointer in call information for a callee function called by the caller function.

4. The processor of claim 1, wherein the stack pointer is a final stack pointer for a caller function's frame, and the execution circuitry is further to store a modified return address in call information for a callee function called by the caller function, the modified return address comprising a portion of a return address offset and metadata.

5. At least one non-transitory machine-readable storage medium comprising instructions, where the instructions when executed by one or more processors implement operations comprising:
obtaining a stack pointer for an address in a stack frame, the stack pointer comprising an offset value;
constructing a decorated pointer comprising the offset value, a maximum offset value indicating a highest address of the stack frame, and additional information comprising at least one of version information and a fixed or computed code value;
constructing an encoded pointer comprising the offset value and ciphertext, the ciphertext based on encrypting a portion of the decorated pointer that includes the maximum offset value and the additional information;
encrypting stack data based on the encoded pointer;
storing the encrypted stack data in the stack frame; and
storing the encoded pointer in a stack pointer register of a processor.

6. The machine-readable storage medium of claim 5, wherein the encoded pointer comprises a value indicating that the encoded pointer is an encoded stack pointer.

7. The machine-readable storage medium of claim 5, wherein the stack pointer is a final stack pointer for a caller function's frame, and the operations further comprise storing a copy of the encoded pointer in call information for a callee function called by the caller function.

8. The machine-readable storage medium of claim 5, wherein the stack pointer is a final stack pointer for a caller function's frame, and the operations further comprise storing a modified return address in call information for a callee function called by the caller function, the modified return address comprising a portion of a return address offset and metadata.

9. A method comprising:
obtaining a stack pointer for an address in a stack frame, the stack pointer comprising an offset value;
constructing a decorated pointer comprising the offset value, a maximum offset value indicating a highest address of the stack frame, and additional information comprising at least one of version information and a fixed or computed code value;
constructing an encoded pointer comprising the offset value and ciphertext, the ciphertext based on encrypting a portion of the decorated pointer that includes the maximum offset value and the additional information;
encrypting stack data based on the encoded pointer;
storing the encrypted stack data in the stack frame; and
storing the encoded pointer in a stack pointer register of a processor.

10. The method of claim 9, wherein the encoded pointer comprises a value indicating that the encoded pointer is an encoded stack pointer.

11. The method of claim 9, wherein the stack pointer is a final stack pointer for a caller function's frame, and the operations further comprise storing a copy of the encoded pointer in call information for a callee function called by the caller function.

12. The method of claim 9, wherein the stack pointer is a final stack pointer for a caller function's frame, and the operations further comprise storing a modified return address in call information for a callee function called by the caller function, the modified return address comprising a portion of a return address offset and metadata.

* * * * *